(12) United States Patent
Kocher

(10) Patent No.: US 9,852,572 B2
(45) Date of Patent: *Dec. 26, 2017

(54) CRYPTOGRAPHIC TOKEN WITH LEAK-RESISTANT KEY DERIVATION

(75) Inventor: Paul C. Kocher, San Francisco, CA (US)

(73) Assignee: CRYPTOGRAPHY RESEARCH, INC., San Francisco, CA (US)

( * ) Notice: Subject to any disclaimer, the term of this patent is extended or adjusted under 35 U.S.C. 154(b) by 614 days.

This patent is subject to a terminal disclaimer.

(21) Appl. No.: 13/245,054

(22) Filed: Sep. 26, 2011

(65) Prior Publication Data

US 2012/0017089 A1    Jan. 19, 2012

Related U.S. Application Data

(63) Continuation of application No. 13/010,034, filed on Jan. 20, 2011, which is a continuation of application
(Continued)

(51) Int. Cl.
*G07F 7/10*      (2006.01)
*G06Q 20/34*     (2012.01)
(Continued)

(52) U.S. Cl.
CPC ......... *G07F 7/1008* (2013.01); *G06Q 20/341* (2013.01); *G06Q 20/40975* (2013.01);
(Continued)

(58) Field of Classification Search
CPC .................................................. G07F 7/1008
(Continued)

(56) References Cited

U.S. PATENT DOCUMENTS

| 1,657,411 A | 1/1928 | Scherbius |
| 2,632,058 A | 3/1953 | Gray ............................ 179/15 |

(Continued)

FOREIGN PATENT DOCUMENTS

| DE | 19511298 A1 | 10/1996 | ............... H04N 7/16 |
| EP | 0240328 A2 | 10/1987 | ............... G06F 1/00 |

(Continued)

OTHER PUBLICATIONS

Kocher, Paul, U.S. Appl. No. 13/010,034, filed Jan. 20, 2011, Office Action dated Dec. 13, 2011 re Restriction Requirement, 8 pages.
(Continued)

*Primary Examiner* — Rutao Wu
*Assistant Examiner* — Monica A Mandel
(74) *Attorney, Agent, or Firm* — Finnegan, Henderson, Farabow, Garrett & Dunner, L.L.P.

(57) ABSTRACT

Methods and apparatuses for increasing the leak-resistance of cryptographic systems are disclosed. A cryptographic token maintains secret key data based on a top-level key. The token can produce updated secret key data using an update process that makes partial information that might have previously leaked to attackers about the secret key data no longer usefully describe the new updated secret key data. By repeatedly applying the update process, information leaking during cryptographic operations that is collected by attackers rapidly becomes obsolete. Thus, such a system can remain secure against attacks involving analysis of measurements of the device's power consumption, electromagnetic characteristics, or other information leaked during transactions. Transactions with a server can be secured with the token.

21 Claims, 4 Drawing Sheets

Related U.S. Application Data

No. 11/977,392, filed on Oct. 24, 2007, which is a continuation of application No. 10/396,975, filed on Mar. 24, 2003, now Pat. No. 7,941,666, which is a continuation of application No. 09/347,493, filed on Jul. 2, 1999, now Pat. No. 6,539,092.

(60) Provisional application No. 60/091,644, filed on Jul. 2, 1998.

(51) Int. Cl.
*G06Q 20/40* (2012.01)
*H04L 9/00* (2006.01)
*H04L 9/06* (2006.01)
*H04L 9/08* (2006.01)

(52) U.S. Cl.
CPC ............ *H04L 9/003* (2013.01); *H04L 9/0625* (2013.01); *H04L 9/0891* (2013.01); *G06F 2207/7219* (2013.01)

(58) Field of Classification Search
USPC .................................. 705/64; 713/161, 172
See application file for complete search history.

(56) References Cited

U.S. PATENT DOCUMENTS

| | | | | |
|---|---|---|---|---|
| 2,733,432 A | 1/1956 | Breckman ................. 340/347 |
| 3,816,762 A | 6/1974 | Holt, Jr. ................... 307/237 |
| 4,078,152 A * | 3/1978 | Tuckerman, III ............ 380/37 |
| 4,107,458 A | 8/1978 | Constant ..................... 178/22 |
| 4,139,839 A | 2/1979 | Engel et al. ................ 340/347 |
| 4,157,454 A * | 6/1979 | Becker ........................ 380/37 |
| 4,200,770 A | 4/1980 | Hellman et al. ............. 178/22 |
| 4,202,051 A | 5/1980 | Davida et al. ................. 375/2 |
| 4,203,166 A | 5/1980 | Ehrsam et al. ................ 375/2 |
| 4,211,919 A | 7/1980 | Ugon ........................ 235/487 |
| 4,214,126 A | 7/1980 | Wipff ..................... 179/1.5 M |
| 4,225,962 A | 9/1980 | Meyr et al. .................... 375/2 |
| 4,243,890 A | 1/1981 | Miller et al. ................ 250/551 |
| 4,268,898 A | 5/1981 | Brown ........................ 363/20 |
| 4,295,041 A | 10/1981 | Ugon ........................ 234/487 |
| 4,309,569 A * | 1/1982 | Merkle ...................... 713/177 |
| 4,369,332 A | 1/1983 | Campbell, Jr. ............ 178/22.07 |
| 4,405,829 A | 9/1983 | Rivest et al. ............... 178/22.1 |
| 4,563,546 A | 1/1986 | Glitz ........................ 178/22.01 |
| 4,569,052 A | 2/1986 | Cohn et al. ................... 371/38 |
| 4,570,084 A | 2/1986 | Griffin et al. ............... 307/452 |
| 4,605,820 A | 8/1986 | Campbell, Jr. ............ 178/22.09 |
| 4,605,921 A | 8/1986 | Riddle et al. .............. 340/347 |
| 4,622,480 A | 11/1986 | Uchimura et al. .......... 307/491 |
| 4,661,658 A * | 4/1987 | Matyas ...................... 713/185 |
| 4,669,117 A | 5/1987 | Van Eck ..................... 380/14 |
| 4,680,688 A | 7/1987 | Inou et al. ................... 363/21 |
| 4,686,392 A | 8/1987 | Lo .......................... 307/448 |
| 4,759,063 A | 7/1988 | Chaum ........................ 380/30 |
| 4,776,011 A | 10/1988 | Busby ........................ 380/37 |
| 4,799,258 A | 1/1989 | Davies ........................ 380/21 |
| 4,813,024 A | 3/1989 | Lisimaque et al. ......... 365/228 |
| 4,881,264 A * | 11/1989 | Merkle ...................... 713/177 |
| 4,888,800 A * | 12/1989 | Marshall et al. ........... 380/281 |
| 4,888,801 A * | 12/1989 | Foster et al. ............... 380/277 |
| 4,905,176 A | 2/1990 | Schulz ...................... 364/717 |
| 4,908,038 A | 3/1990 | Matsumura et al. ........... 902/5 |
| 4,916,333 A | 4/1990 | Kowalski ................. 307/296.5 |
| 4,932,053 A | 6/1990 | Fruhauf et al. ............... 380/4 |
| 4,932,057 A | 6/1990 | Kolbert ...................... 380/33 |
| 4,933,969 A * | 6/1990 | Marshall et al. ........... 713/177 |
| 4,937,649 A | 6/1990 | Shiba et al. .................. 357/51 |
| 4,937,866 A | 6/1990 | Crowther et al. ............. 380/20 |
| 4,944,007 A | 7/1990 | Austin ........................ 380/21 |
| 4,969,188 A * | 11/1990 | Schobi ...................... 380/277 |
| 4,972,472 A * | 11/1990 | Brown et al. ............... 380/277 |
| 5,017,766 A | 5/1991 | Tamada et al. ............. 235/492 |
| 5,068,894 A | 11/1991 | Hoppe ........................ 380/23 |
| 5,081,677 A * | 1/1992 | Green et al. ................ 380/281 |
| 5,086,467 A | 2/1992 | Malek ......................... 380/6 |
| 5,136,643 A | 8/1992 | Fischer ....................... 380/23 |
| 5,136,646 A | 8/1992 | Haber et al. .................. 380/49 |
| 5,144,667 A | 9/1992 | Pogue, Jr. et al. ............ 380/45 |
| 5,149,992 A | 9/1992 | Allstot et al. .............. 307/448 |
| 5,157,725 A | 10/1992 | Lindholm ..................... 380/9 |
| 5,159,632 A | 10/1992 | Crandall ..................... 380/28 |
| 5,165,098 A | 11/1992 | Hoivik ........................ 380/8 |
| 5,177,430 A | 1/1993 | Mohel ....................... 323/284 |
| 5,181,243 A | 1/1993 | Saltwick et al. ............... 380/6 |
| 5,216,713 A | 6/1993 | Lindholm ..................... 380/7 |
| 5,241,598 A | 8/1993 | Raith ......................... 380/21 |
| 5,243,648 A | 9/1993 | Gilardi et al. .................. 380/6 |
| 5,249,294 A | 9/1993 | Griffin, III et al. .......... 395/650 |
| 5,293,029 A | 3/1994 | Iijima ....................... 235/380 |
| 5,297,201 A | 3/1994 | Dunlavy ....................... 380/6 |
| 5,297,207 A | 3/1994 | Degele ........................ 380/46 |
| 5,311,595 A * | 5/1994 | Bjerrum et al. ............. 713/169 |
| 5,341,423 A | 8/1994 | Nossen ........................ 380/6 |
| 5,355,413 A | 10/1994 | Ohno ......................... 380/24 |
| 5,369,706 A | 11/1994 | Latka ......................... 380/23 |
| 5,399,996 A | 3/1995 | Yates et al. ................. 331/74 |
| 5,401,950 A | 3/1995 | Yoshida ..................... 235/487 |
| 5,402,402 A | 3/1995 | Kagami et al. ........... 369/44.28 |
| 5,404,402 A | 4/1995 | Sprunk ........................ 380/4 |
| 5,412,379 A | 5/1995 | Waraksa et al. ......... 340/825.72 |
| 5,412,723 A * | 5/1995 | Canetti et al. .............. 713/155 |
| 5,412,730 A | 5/1995 | Jones ......................... 380/46 |
| 5,414,614 A | 5/1995 | Fette et al. .................. 363/59 |
| 5,420,925 A | 5/1995 | Michaels ..................... 380/23 |
| 5,428,684 A | 6/1995 | Akiyama et al. .............. 380/25 |
| 5,434,919 A | 7/1995 | Chaum ........................ 380/30 |
| 5,444,288 A | 8/1995 | Jacobs ....................... 257/503 |
| 5,450,563 A * | 9/1995 | Gregor ........................ 711/3 |
| 5,455,862 A * | 10/1995 | Hoskinson ................. 380/262 |
| 5,477,039 A | 12/1995 | Lisimaque et al. .......... 235/380 |
| 5,481,555 A | 1/1996 | Wade et al. ............... 371/57.2 |
| 5,483,182 A | 1/1996 | Rybicki ....................... 327/5 |
| 5,483,598 A | 1/1996 | Kaufman et al. ............. 380/43 |
| 5,495,098 A | 2/1996 | Pailles et al. ............... 235/492 |
| 5,506,905 A | 4/1996 | Markowski et al. ........... 380/25 |
| 5,511,123 A | 4/1996 | Adams ........................ 380/29 |
| 5,514,982 A | 5/1996 | Hall et al. .................... 326/83 |
| 5,515,438 A | 5/1996 | Bennett et al. ............... 380/21 |
| 5,539,825 A | 7/1996 | Akiyama et al. .............. 380/24 |
| 5,539,827 A | 7/1996 | Liu ........................... 380/37 |
| 5,544,086 A | 8/1996 | Davis et al. ................. 364/408 |
| 5,546,463 A | 8/1996 | Caputo et al. ................ 380/25 |
| 5,551,013 A | 8/1996 | Beausoleil et al. .......... 395/500 |
| 5,552,776 A | 9/1996 | Wade et al. ............. 340/825.31 |
| 5,557,346 A | 9/1996 | Lipner et al. ................ 380/21 |
| 5,559,887 A | 9/1996 | Davis et al. .................. 380/24 |
| 5,559,890 A | 9/1996 | Obermeier et al. ............ 380/48 |
| 5,572,112 A | 11/1996 | Saeki et al. ................ 323/282 |
| 5,600,273 A | 2/1997 | Hall et al. .................. 327/261 |
| 5,600,324 A | 2/1997 | Reed et al. ................. 341/176 |
| 5,602,917 A | 2/1997 | Mueller ...................... 380/21 |
| 5,608,614 A | 3/1997 | Ohnishi et al. ............... 363/60 |
| 5,623,548 A | 4/1997 | Akiyama et al. .............. 380/28 |
| 5,625,692 A | 4/1997 | Herzberg et al. ............. 380/21 |
| 5,625,695 A | 4/1997 | M'Raihi et al. .............. 380/28 |
| 5,631,492 A | 5/1997 | Ramus et al. ............... 257/532 |
| 5,633,930 A | 5/1997 | Davis et al. .................. 380/24 |
| 5,636,157 A | 6/1997 | Hesson et al. .............. 364/788 |
| 5,638,444 A | 6/1997 | Chou et al. ................... 380/21 |
| 5,663,896 A | 9/1997 | Aucsmith ................. 395/187.01 |
| 5,664,017 A | 9/1997 | Gressel et al. ................ 380/30 |
| 5,668,877 A | 9/1997 | Aziz .......................... 380/30 |
| 5,670,934 A | 9/1997 | Ina et al. ................... 340/426 |
| 5,675,649 A * | 10/1997 | Brennan et al. ............ 380/286 |
| 5,696,827 A | 12/1997 | Brands ....................... 380/30 |
| 5,703,413 A | 12/1997 | Treharne ................... 307/10.5 |
| 5,708,711 A * | 1/1998 | Rosauer et al. ............. 380/273 |
| 5,710,834 A | 1/1998 | Rhoads ...................... 382/232 |
| 5,721,777 A * | 2/1998 | Blaze ........................ 380/286 |
| 5,727,062 A | 3/1998 | Ritter ......................... 380/37 |
| 5,727,063 A | 3/1998 | Aiello et al. ................. 380/46 |

(56) References Cited

U.S. PATENT DOCUMENTS

| | | | |
|---|---|---|---|
| 5,733,047 A | 3/1998 | Furuta et al. | 384/43 |
| 5,737,419 A | 4/1998 | Ganesan | 380/21 |
| 5,745,577 A | 4/1998 | Leech | 380/28 |
| 5,757,907 A * | 5/1998 | Cooper et al. | 705/52 |
| 5,761,306 A | 6/1998 | Lewis | 380/21 |
| 5,764,766 A | 6/1998 | Spratte | 380/21 |
| 5,778,065 A | 7/1998 | Hauser et al. | 380/21 |
| 5,778,069 A | 7/1998 | Thomlinson et al. | 380/25 |
| 5,778,074 A | 7/1998 | Garcken et al. | 380/37 |
| 5,781,631 A | 7/1998 | Chaum | 380/24 |
| 5,784,464 A * | 7/1998 | Akiyama et al. | 713/155 |
| 5,796,830 A * | 8/1998 | Johnson et al. | 380/286 |
| 5,796,836 A | 8/1998 | Markham | 380/28 |
| 5,796,839 A * | 8/1998 | Ishiguro | 380/44 |
| 5,812,669 A | 9/1998 | Jenkins et al. | 380/25 |
| 5,821,775 A | 10/1998 | Mehta et al. | 326/98 |
| 5,825,881 A * | 10/1998 | Colvin, Sr. | 705/78 |
| 5,835,599 A | 11/1998 | Buer | 380/29 |
| 5,838,795 A | 11/1998 | Mittenthal | 380/28 |
| 5,848,159 A | 12/1998 | Collins et al. | 380/30 |
| 5,859,548 A | 1/1999 | Kong | 326/113 |
| 5,870,478 A | 2/1999 | Kawamura | 380/30 |
| 5,892,829 A | 4/1999 | Aiello et al. | 380/25 |
| 5,905,399 A | 5/1999 | Bosnyak et al. | 327/384 |
| 5,907,832 A | 5/1999 | Pieterse et al. | 705/39 |
| 5,914,471 A | 6/1999 | Van De Pavert | 235/380 |
| 5,915,025 A * | 6/1999 | Taguchi et al. | 380/44 |
| 5,917,168 A | 6/1999 | Nakamura et al. | 235/379 |
| 5,917,754 A | 6/1999 | Pathak et al. | 365/185.21 |
| 5,917,911 A * | 6/1999 | Dabbish et al. | 380/286 |
| 5,944,833 A | 8/1999 | Ugon | 713/400 |
| 5,946,397 A | 8/1999 | M'Raihi et al. | 380/30 |
| 5,982,900 A | 11/1999 | Ebihara et al. | 380/30 |
| 5,991,415 A | 11/1999 | Shamir | 380/30 |
| 5,994,917 A | 11/1999 | Wuidart | 326/8 |
| 5,995,624 A | 11/1999 | Fielder et al. | 380/25 |
| 5,995,629 A | 11/1999 | Reiner | 380/50 |
| 5,998,978 A | 12/1999 | Connell et al. | 323/273 |
| 6,009,174 A | 12/1999 | Tatebayashi et al. | 380/21 |
| 6,009,177 A | 12/1999 | Sudia | 380/25 |
| 6,018,717 A | 1/2000 | Lee et al. | 705/13 |
| 6,028,454 A | 2/2000 | Elmasry et al. | 326/115 |
| 6,031,912 A | 2/2000 | Moulart et al. | 380/44 |
| 6,041,122 A | 3/2000 | Graunke et al. | 380/21 |
| 6,041,123 A * | 3/2000 | Colvin, Sr. | 713/153 |
| 6,041,412 A | 3/2000 | Timson et al. | 713/200 |
| 6,046,608 A | 4/2000 | Theogarajan | 326/121 |
| 6,047,068 A | 4/2000 | Rhelimi et al. | 380/46 |
| 6,049,613 A | 4/2000 | Jakobsson | 380/47 |
| 6,064,724 A | 5/2000 | Kelly | 379/92.04 |
| 6,064,740 A | 5/2000 | Curiger et al. | 380/265 |
| 6,066,965 A | 5/2000 | Blomgren et al. | 326/95 |
| 6,069,497 A | 5/2000 | Blomgren et al. | 326/105 |
| 6,069,954 A | 5/2000 | Moreau | 380/28 |
| 6,069,957 A * | 5/2000 | Richards | 380/281 |
| 6,070,795 A | 6/2000 | Feiken | 235/380 |
| 6,075,865 A | 6/2000 | Scheidt et al. | 380/255 |
| 6,078,663 A | 6/2000 | Yamamoto | 380/9 |
| 6,090,153 A | 7/2000 | Chen et al. | 716/8 |
| 6,097,811 A * | 8/2000 | Micali | 713/186 |
| 6,101,477 A | 8/2000 | Hohle et al. | 702/1 |
| 6,107,835 A | 8/2000 | Blomgren et al. | 326/98 |
| 6,115,601 A | 9/2000 | Ferreira | 455/406 |
| 6,128,391 A | 10/2000 | Denno et al. | 380/283 |
| 6,181,596 B1 | 1/2001 | Horne et al. | 365/168 |
| 6,185,307 B1 | 2/2001 | Johnson, Jr. | 380/270 |
| 6,185,596 B1 | 2/2001 | Hadad et al. | 708/491 |
| 6,185,685 B1 | 2/2001 | Morgan et al. | 713/183 |
| 6,211,456 B1 | 4/2001 | Seningen et al. | 174/27 |
| 6,222,923 B1* | 4/2001 | Schwenk | 380/44 |
| 6,226,750 B1 | 5/2001 | Trieger | 713/201 |
| 6,236,981 B1 | 5/2001 | Hill | 705/67 |
| 6,247,129 B1 | 6/2001 | Keathley et al. | 713/156 |
| 6,278,783 B1 | 8/2001 | Kocher et al. | 380/277 |
| 6,289,455 B1 | 9/2001 | Kocher et al. | 713/194 |
| 6,298,442 B1 | 10/2001 | Kocher et al. | 713/194 |
| 6,304,658 B1 | 10/2001 | Kocher et al. | 380/30 |
| 6,327,661 B1 | 12/2001 | Kocher et al. | 713/193 |
| 6,336,188 B2 | 1/2002 | Blake-Wilson et al. | 713/171 |
| 6,345,359 B1 | 2/2002 | Bianco | 713/190 |
| 6,373,948 B1* | 4/2002 | Wool | 380/241 |
| 6,381,699 B2 | 4/2002 | Kocher et al. | 713/172 |
| 6,393,567 B1 | 5/2002 | Colnot | 713/182 |
| 6,434,238 B1 | 8/2002 | Chaum et al. | 380/45 |
| 6,442,525 B1 | 8/2002 | Silverbrook et al. | 705/1 |
| 6,448,981 B1 | 9/2002 | Kaczmarski | 345/763 |
| 6,453,296 B1 | 9/2002 | Iwamura | 705/1 |
| 6,510,518 B1 | 1/2003 | Jaffe et al. | 713/168 |
| 6,539,092 B1* | 3/2003 | Kocher | G06Q 20/341 380/1 |
| 6,577,734 B1* | 6/2003 | Etzel et al. | 380/277 |
| 6,654,884 B2 | 11/2003 | Jaffe et al. | 713/168 |
| 6,690,795 B1* | 2/2004 | Richards | 380/203 |
| 6,698,662 B1 | 3/2004 | Feyt et al. | 235/492 |
| 6,735,313 B1* | 5/2004 | Bleichenbacher et al. | 380/241 |
| 6,748,410 B1 | 6/2004 | Gressel et al. | 708/491 |
| 6,978,370 B1 | 12/2005 | Kocher | 713/176 |
| 7,073,072 B1 | 7/2006 | Salle | 713/193 |
| 7,599,488 B2 | 10/2009 | Kocher et al. | 380/1 |
| 7,941,666 B2* | 5/2011 | Kocher | G06Q 20/341 380/262 |
| 2001/0010723 A1* | 8/2001 | Pinkas | 380/286 |
| 2001/0016908 A1 | 8/2001 | Blake-Wilson et al. | 713/171 |
| 2001/0053220 A1 | 12/2001 | Kocher et al. | 380/29 |
| 2002/0118190 A1 | 8/2002 | Greasley | 345/426 |
| 2002/0124178 A1 | 9/2002 | Kocher et al. | 713/193 |
| 2003/0028771 A1 | 2/2003 | Kocher et al. | 713/172 |
| 2003/0188158 A1 | 10/2003 | Kocher | 713/161 |
| 2006/0045264 A1 | 3/2006 | Kocher et al. | 380/37 |
| 2008/0022146 A1 | 1/2008 | Kocher et al. | 713/600 |
| 2008/0059826 A1 | 3/2008 | Kocher et al. | 713/340 |

FOREIGN PATENT DOCUMENTS

| | | | |
|---|---|---|---|
| EP | 0304733 A1 | 3/1989 | H04L 9/00 |
| EP | 0424415 B1 | 5/1991 | H04K 3/00 |
| EP | 0452031 A2 | 10/1991 | H03L 7/197 |
| EP | 0529261 A2 | 3/1993 | H04L 9/08 |
| EP | 0563912 A1 | 10/1993 | G06F 1/00 |
| EP | 0582395 A2 | 2/1994 | H04L 29/06 |
| EP | 0656708 A1 | 6/1995 | H04L 9/08 |
| EP | 0660562 A2 | 6/1995 | H04L 9/00 |
| EP | 0790547 A1 | 8/1997 | G06F 1/00 |
| EP | 0826169 B1 | 11/2002 | G06F 1/04 |
| EP | 1080400 B1 | 11/2002 | G06F 1/00 |
| EP | 1064752 B1 | 8/2003 | H04L 9/06 |
| EP | 1062633 B1 | 12/2003 | G06K 19/073 |
| EP | 1204948 B1 | 2/2004 | G06K 19/073 |
| EP | 1084543 B1 | 1/2008 | |
| FR | 2738970 A1 | 3/1997 | H04L 9/18 |
| FR | 2738971 A1 | 3/1997 | H04L 9/10 |
| JP | 60-146361 A2 | 8/1985 | G06F 15/30 |
| JP | 62-082702 A2 | 4/1987 | H03B 29/00 |
| JP | 62-166489 A2 | 7/1987 | G06F 15/30 |
| JP | 62-260406 A2 | 11/1987 | H03B 29/00 |
| JP | 64-081087 | 3/1989 | G06K 17/00 |
| JP | 02-187888 A2 | 7/1990 | G06K 17/00 |
| JP | 05-094458 A2 | 4/1993 | G06F 15/21 |
| JP | 09-163469 A2 | 6/1997 | E05B 49/00 |
| JP | 10-084223 A2 | 3/1998 | H03B 29/00 |
| JP | 10-171717 A2 | 6/1998 | G06F 12/14 |
| JP | 10-197610 A2 | 7/1998 | G01R 31/00 |
| WO | WO 97-13342 | 4/1967 | H04L 9/32 |
| WO | WO 97-14085 | 4/1997 | G06F 1/00 |
| WO | WO 97-14086 | 4/1997 | G06F 1/00 |
| WO | WO 97-33217 | 9/1997 | G06F 1/00 |
| WO | WO 98-52319 | 11/1998 | H04L 9/30 |
| WO | WO 99-08411 | 2/1999 | H04K 1/00 |
| WO | WO 99-49416 | 9/1999 | G06K 19/073 |

(56) References Cited

FOREIGN PATENT DOCUMENTS

| WO | WO 99-63419 | 12/1999 | ............... G06F 1/00 |
| WO | WO 99-63696 | 12/1999 | ............... H04K 1/00 |

OTHER PUBLICATIONS

Kocher, Paul, U.S. Appl. No. 13/010,034, filed Jan. 20, 2011, Response dated Feb. 1, 2012 to the Office Action dated Dec. 13, 2011 re Restriction Requirement, 3 pages.

Leighton, Tom, et al., "Secret-Key Agreement without Public-Key Cryptography (Extended Abstract)," Advances in Cryptology, CRYPTO '93, LNCS 773, p. 456-479, 1994, Springer-Verlag Berlin Heidelberg 1994. 24 pages.

Lee, Jooyoung, et al., "Tree-based Key Distribution Patterns," Lecture Notes in Computer Science, 2006, vol. 3897/2006, 189-204, DOI: 10.1007/11693383_13. 14 pages.

Draper, et al., "Circuit Techniques in a 266-MHz MMX-Enabled Processor," IEEE Journal of Solid-State Circuits, vol. 32, No. 11, pp. 1650-1664, Nov. 1997, 15 pages.

Notification Concerning Transmittal of International Preliminary Report on Patentability (Chapter I) dated Dec. 10, 2009, including Written Opinion of the Int'l Searching Authority re International Application No. PCT/US2008/003961, 8 pages.

Kocher, Paul, "Timing Attacks on Implementations of Diffie-Hellman, RSA, DSS and Other Systems," in: Koblitz, N., Advances in Cryptology—CRYPTO '96 (Berlin, Springer, 1996), Aug. 18, 1996, XP000626590, 10 pages.

"Security Requirements for Cryptographic Modules," Federal Information Processing Standards Publication (FIPS PUB) 140-1, U.S. Department of Commerce, National Institute of Commerce, National Institute of Standards and Technology, Jan. 1994, 49 pages.

Ryan, John, "Blinds for Thermodynamic Cipher Attacks," unpublished material on the world wide web at http://www.cypertrace.com/papers/thrmatak.html, Mar. 1996. 8 pages.

"Data Encryption Standard," Federal Information Processing Standards Publication (FIPS PUB) 46-2, U.S. Department of Commerce, National Institute of Standards and Technology, Dec. 30, 1993, 19 pages.

Biham, E., et al., "Differential Fault Analysis of Secret Key Cryptosystems," in Kaliski, B., Advances in Cryptology—CRYPTO 97, (Berlin, Springer, 1997) 17th Annual International Cryptology Conference, Aug. 17-21, 1997, pp. 513-525, 14 pages.

Wayner, Peter, "Code Breaker Cracks Smart Cards' Digital Safe," The New York Times on the web, Jun. 22, 1998, http://www.nytimes.com/library/tech/98/06/biztech/articles/22card.html—3 pages.

Krawczyk, H., et al., "HMAC: Keyed-Hashing for Message Authentication," Network Working Group Request for Comments RFC 2104, Feb. 1997, 11 pages.

Based on "Karn/Hoey/Outerbridge implementations (Khodes): File DESC.C from RSAREF-Data Encryption Standard routines for RSAREF," Jul. 27, 2010, 12 pages.

Schneier, Bruce, "Applied Cryptography, Second Edition: Protocols, Algorithms, and Source Code in C," Oct. 18, 1995, 1027 online pages.

Menezes, A. J. et al., Handbook of Applied Cryptography (CRC Press, 1996), pp. 285-298, 312-319, 452-462, 475, and 515-524 found at http://www.cacr.math.uwaterloo.ca/hac/—on Jun. 22, 2011, 45 pages.

Hachez, et al., "Timing Attack: What Can Be Achieved by a Powerful Adversary?" May 1999, 8 pages.

Kocher, Paul C., "Cryptanalysis of Diffie-Hellman, RSA, DSS, and Other Systems Using Timing Attacks," Report on Dec. 7, 1995, 6 pages.

Bauer, Friedrich L., "Cryptology—Methods and Maxims", Technical University Munich, 1998, pp. 31-48, 18 pages.

Jueneman, Robert R., "Analysis of Certain Aspects of Output Feedback Mode," Satellite Business Systems, 1998, pp. 99-127, 30 pages.

Conner, Doug (technical editor), "Cryptographic Techniques—Secure your Wireless Designs", Jan. 18, 1996, pp. 57-68, 11 pages.

Kaliski, Burt, "Timing Attacks on Cryptosystems," RSA Laboratories, Bulletin No. 2, Jan. 23, 1996, 2 pages.

Bellare, et al., "Incremental Cryptography: The Case of Hashing and Signing" in: Desmedt, Y., Advances in Cryptology-Crypto '94 Proceedings (Berlin, Springer, 1994) pp. 216-233, 18 pages.

Hornauer, et al., "Markov Ciphers and Alternating Groups", Eurocrypt '91, 1991; pp. 453-460, 8 pages.

Koblitz, Neal, "A Course in Number Theory and Cryptography," Second Edition, May 1994, Chapter III, pp. 54-77, 13 pages.

Lai, et al., "Markov Ciphers and Differential Cryptanalysis", Springer-Verlag, 1998; pp. 17-38, 22 pages.

Back, Adam, "Non-Interactive Forward Secrecy," Sep. 6, 1996, found at http://www.cypherspace.org/adam/nifs/stmt.txt, Jul. 12, 2011, 2 pages.

Bell, Jim, "Spread-Spectrum Computer Clock"? Dec. 24, 1995, Google Beta Groups, last modified Aug. 22, 1999, found at http://lambda-diode.com/resources/tempest/jb.html Jul. 12, 2011, 3 pages.

Bellare, et al., "Optimal Asymmetric Encryption," Advanced Networking Laboratories, Springer-Verlag, USA, 1998, pp. 92-111, 20 pages.

Bellare, et al., "The Exact Security of Digital Signatures—How to Sign with RSA and Rabin," Mar. 14, 1996, Advances in Cryptology—Eurocrypt '96 Proceedings, Lecture Notes in Computer Science, vol. 1070, U. Maurer ed., Springer-Verlag, pp. 1-17, 17 pages.

Bellare et al., "Forward Integrity for Secure Audit Logs", Nov. 23, 1997, USA, pp. 1-16, 16 pages.

Frankel et al., "Optimal-Resilience Proactive Public-Key Cryptosystems," IEEE Symposium on Foundations of Computer Science, 1997, 12 pages.

Herzberg et al., "Proactive Public Key and Signature Systems", Dec. 9, 1996, ACM Conference on Computer and Communications Security, 15 pages.

Menezes, et al., "Pseudorandom Bits and Sequences," Handbook of Applied Cryptography, CRC Press, Chapter 5, 1996, pp. 169-190, 22 pages.

Menezes, et al., "Efficient Implementation," Handbook of Applied Cryptography, CRC Press, Chapter 14, 1996, pp. 591-634, 44 pages.

Anderson et al., "Tamper Resistance—a Cautionary Note", The Second USENIX Workshop on Electronic Commerce Proceedings, Nov. 18-21, 1996, Oakland, CA, 11 pages.

Guillou, L.C. et al., "Smart Cards and Conditional Access," Advances in Cryptology—Eurocrypt '84; LNCS 209, Springer-Verlag, Berlin, Germany; (1985) Copyright (c) 1998, pp. 480-489, 10 pages.

Guthery, Scott, "Smart Cards," last changed May 28, 1998, found online at http://www.usenix.org/publications/login/1998-5/guthery.html Jul. 12, 2011, 6 pages.

Kuhn, et al., "Soft Tempest: Hidden Data Transmission Using Electromagnetic Emanations," Second Workshop on Information Hiding, Portland, Oregon, Apr. 15-17, 1998, 21 pages.

Menezes, A. J. et al., "Handbook of Applied Cryptography," Chapters 1, 5, and 7; CRC Press, 1997, Boca Raton, Florida, 130 pages.

Beker et al., "Key Management for Secure Electronic Funds Transfer in a Retail Environment," Proc. Crypto '84, Springer-Verlag, 1998, pp. 401-410, 10 pages.

Daemen, Joan, "Management of Secret Keys: Dynamic Key Handling," LNCS 1528, Proc. COSIC '97 Course, Springer-Verlag, 1998, pp. 264-276, 13 pages.

Menezes, et al., "Handbook of Applied Cryptograph,", CRC Press, Boca Raton, Florida (1997), pp. 71, 586, 636-637, 6 pages.

ISO (International Organization for Standardization),"Banking—Key management (retail)—Part2: Key management techniques for symmetric ciphers," ISO 11568-2 First edition Dec. 1, 1994, www.saiglobal.com/shop pp. 1-16, 16 pages.

ISO (International Organization f or Standardization), "Banking—Key management (retail)—Part 3: Key life cycle for symmetric ciphers," ISO 11568-3 First edition Dec. 1, 1994, www.saiglobal.com/shop pp. 1-16,. 16 pages.

Daemen, Joan, "Management of Secret Keys: Dynamic Key Handling," Course on Computer Security and Industrial Cryptography

(56) References Cited

OTHER PUBLICATIONS (COSIC '97—Jun. 1997). Presentation slides and declaration of Professor Bart Preneel dated Jun. 15, 2007, 10 pages.
Davies, et al., "Security for Computer Networks: An Introduction to Data Security in Teleprocessing and Electronic Funds Transfer," 2nd Ed., John Wiley & Sons, New York, NY, 1989. pp. 318-321, 6 pages.
Bradley, Steven, "Derived Unique Key Per Transaction Schemes," Some Applications of Mathematics to the Theory of Communications: Chapter 4, Ph.D. Thesis, University of London, England, 1994, pp. 132-199, 38 pages.
Interbank Card Association, "PIN Manual: A Guide to the Use of Personal Identification Numbers in Interchange", 1979, pp. 61-127, 69 pages.
Sedgewick, Robert, "Algorithms," 2nd Ed., Chapters 4 and 11, Addison-Wesley, Arlington, VA, 1988, 23 pages.
RSA Data Security, "RSAREF Cryptographic Toolkit Source Code," File R-RANDOM C, available from ftp://ftp.rsa.com last revised Apr. 15, 1994, created 1991, 8 pages.
Rivest, Ronald, "Announce: Timing Cryptanalysis of RSA, DH, DDS," Google Beta Groups, Dec. 11, 1995, 1 page.
Lacy, et al., "CryptoLib Version 1.1," File Bigpow.c from CryptoLib, United States, Nov. 1999, 13 pages.
Frankel, et al., "Proactive RSA," Lecture notes in Computer Science, 1996, 22 pages.
Anderson, et al., "Robustness Principles for Public Key Protocols," LNCS 963, Proc. Crypto '95, Aug. 27-31, 1995, pp. 236-247, 12 pages.
Anderson, Ross, "Two Remarks on Public Key Cryptology", Computer Laboratory, University of Cambridge, Technical Report, No. 549, Dec. 2002, ISSN 1476-2986, 7 pages.
Boneh, et al., "On the Importance of Eliminating Errors in Cryptographic Computations," Journal of Cryptology, 2001, vol. 14, No. 2, pp. 101-119, 17 pages.
Burmester, et al., "A Secure and Efficient Conference Key Distribution System," LNCS 1189, Proc. International Workshop on Security Protocols, 1996, Springer-Verlag, 1998, pp. 275-286, 11 pages.
Gennaro, et al., "Robust Threshold DSS Signatures," LNCS 1070, Proc. Eurocrypt '96, Springer-Verlag, 1998. pp. 354-371, 17 pages.
Gillogly, et al., "Notes on Crypto '95 Invited Talks by R. Morris and A. Shamir," Cipher 9, Sep. 18, 1995; http://www.ieee-security.org/Cipher/ConfReports/conf-rep-Crypto95.html—2 pages.
Herzberg, et al., "Proactive Secret Sharing Or: How to Cope with Perpetual Leakage," LNCS 963. Proc. Crypto '95, Springer-Verlag, 1998, pp. 339-352, 14 pages.
Jablon, David P., "Strong Password-Only Authenticated Key Exchange", Computer Communication Review, Sep. 25, 1996, vol. 26, No. 5, pp. 5-26, 22 pages.
Kocher, P., Message: "Re: Timing cryptanalysis of RSA, DH, DSS (Tomazic, Risks-17.59)," The Risks Digest, Forum on Risks to the Public in Computers and Related Systems, vol. 17; Issue 60, Jan. 3, 1996, website: http://catless.ncl.ac.uk/Risks/17.60.html—1 page.
Matsumoto, et al., "Speeding Up Secret Computations with Insecure Auxiliary Devices", LNCS 403, Proc. Crypto '88, Springer-Verlag, 1998, pp. 497-506, 20 pages.
Naccache, et al., "Can D.S.A. be Improved?"—Complexity Trade-Offs with the Digital Signature Standard-, LNCS 950, Proc. Eurocrypt '94, 1995, Springer-Verlag, 1998, pp. 77-85. 13 pages.
Naccache, David, "Can O.S.S. be Repaired"?—Proposal for a New Practical Signature Scheme-, LNCS 765, Proc. Eurocrypt '93, 1994, Springer-Vertag, 1998, pp. 233-239, 8 pages.
Quisquater, et al., "Fast Decipherment Algorithm for RSA Public-Key Cryptosystem," Aug. 27, 1982, Electronics Letters Oct. 14, 1982, vol. 18, No. 21, pp. 905-907, 3 pages.
Robshaw, et al., "Overview of Elliptic Curve Cryptosystems," RSA Laboratories Technical Note, revised Jun. 27, 1997, website: http://www.rsa.com/rsalabs/node.asp?id=2013#—9 pages.
Schnorr, C. P., "Efficient Signature Generation by Smart Cards," Journal of Cryptology, 1991, pp. 161-174, 14 pages.
Steiner, et al., "Diffie-Hellman Key Distribution Extended to Group Communication," Third ACM Conf. Computer and Comm. Security, Mar. 1996, pp. 31-37, 7 pages.
Yen et al., "RSA Speedup with Chinese Remainder Theorem Immune Against Hardware Fault Cryptanalysis", IEEE Transactions on Computers, Apr. 2003, vol. 52, No. 4, pp. 461-472, 12 pages.
Guillou, et al., "Smart Card, A Highly Reliable and Portable Security Device," Advances in Cryptology—CRYPTO '86; LNCS 263, Springer-Verlag, Berlin, Germany; (1987) pp. 464-479, 16 pages.
Highland, Harold Joseph, "The Tempest Over Leaking Computers," Hardcopy Abacus, vol. 5, No. 2, Winter 1988, pp. 10-18, 53; http://cryptome.org/tempest-leak.htm—9 pages.
Smulders, Peter, "The Threat of Information Theft by Reception of Electromagnetic Radiation from RS-232 Cables," Computers and Security, vol. 9, pp. 53-58, 1990; Elsevier Science Publishers Ltd., 6 pages.
Hevia, et al., "Strength of Two Data Encryption Standard Implementations Under Timing Attacks", Lecture Notes in Computer Science 1380—Latin '98: Theoretical Informatics 3rd Latin American Symposium, Campinas, Brazil, Apr. 1998; pp. 192-205, 14 pages.
Kocher, Paul, "Differential Power Analysis," The Risks Digest, vol. 19(80), ACM Committee on Computers and Public Policy, New York, Jun. 10, 1998; http://catless.ncl.ac.uk/Risks/19.80.html#subj3—3 pages.
Alon, et al., "Efficient Dynamic-Resharing 'Verifiable Secret Sharing' Against Mobile Adversary", Mar. 25, 1995, 14 pages.
Charnes, et al., "Comments on Soviet Encryption Algorithm," Proc. EUROCRYPT '94, Springer-Verlag, 1998, pp. 433-438, 6 pages.
Maurer, Ueli M., "A Provably-Secure Strongly-Randomized Cipher," Springer-Verlag, 1998, 13 pages.
Shamir, Adi, "How to Share a Secret," Communications of the ACM, Nov. 1979, vol. 22, No. 11, pp. 612-613, 2 pages.
De Rooij, Peter, "Efficient Exponentiation Using Precomputation and Vector Addition Chains," 1994, Springer-Verlag, 1998, possibly a reprint from Advances in Cryptology, EUROCRYPT '94, pp. 389-399, 11 pages.
Dimitrov, et al., "An Algorithm for Modular Exponentiation," Information Processing Letters, vol. 66, Issue 3, pp. 155-159, May 15, 1998. 12 pages.
Dimitrov, et al., "Two Algorithms for Modular Exponentiation Using Nonstandard Arithmetics," IEICE Trans. Fundamentals, vol. E78-A, No. 1, Jan. 1995, 6 pages.
Hong, et al., "New Modular Multiplication Algorithms for Fast Modular Exponentiation," Springer-Verlag, 1998, from Advances in Cryptology, EUROCRYPT '96, 1996, pp. 166-177, 12 pages.
Jedwab, et al., "Minimum weight modified signed-digit representations and fast exponentiation," Jun. 26, 1989, Electronics Letters, vol. 25, No. 17, Aug. 17, 1989, pp. 1171-1172, 2 pages.
Koc, Cetin K., "High-Radix and Bit Recoding Techniques for Modular Exponentiation," Nov. 22, 1990, Intern. J. Computer Math, vol. 40, Gordon and Breach Science Publishers, S.A. (UK), pp. 139-156, 1991, 18 pages.
Egecioglu, et al., "Exponentiation Using Canonical Recoding," Theoretical Computer Science 129, Elsevier, 1994, pp. 407-417, 11 pages.
Koc, Cetin K., "High-Speed RSA Implementation," RSA Laboratories, Nov. 1994, 73 pages.
Lim et al., "More Flexible Exponentiation with Precomputation", Advances in Cryptology, Springer-Verlag, 1998, possible from CRYPTO '94, Aug. 1994, 13 pages.
Anderson, et al., "Tiger: A Fast New Hash Function," Fast Software Encryption, Third International Workshop Proceedings, Springer-Verlag, Berlin, Germany, 1996, pp. 89-97, 12 pages.
Eberle, et al., "A 1 GBit/second GaAs DES Chip," Proceedings of the 1992 IEEE Custom Integrated Circuits Conference, May 3-6, 1992, 4 pages.
Eichelberger, et al., "Differential Current Switch—High Performance at Low Power", IBM J. Res. Develop., 35(3):313-320, May 1991, 8 pages.

(56) References Cited

OTHER PUBLICATIONS

Gonzalez, et al., "TCMOS: A Low Noise Power Supply Technique for Digital ICs," Electronics Letters, 31(16):1338-1339, Aug. 3, 1995, 2 pages.
Greub, et al., "High-Performance Standard Cell Library and Modeling Technique for Differential Advanced Bipolar Current Tree Logic", *IEEE Journal of Solid-State Circuits*, 26(5):749-762, May 1991, 14 pages.
Hough, et al., "New Approaches for On-Chip Power Switching Noise Reduction," Proceedings of the IEEE1995 Custom Integrated Circuits Conference, May 1-4, 1995, pp. 133-136, 4 pages.
Ivey, et al., "A Single Chip Public Key Encryption Sub-System," *IEEE J. Solid-State Circuits* 24(4):1071-1075, Aug. 1989, 4 pages.
Jarecki, Stanislaw, "Proactive Secret Sharing and Public Key Cryptosystems", thesis, Massachusetts Institute of Technology, Sep. 1995, Cambridge, MA, 81 pages.
Karlsson, et al., "Implementation of Bit-Serial Adders Using Robust Differential Logic", Proc. IEEE Nordic Event in ASIC Design Conf., NORCHIP'97, Tallin, Estonia, Nov. 10-11, 1997, 8 pages.
Lin, Mao-Chao, "Constant Weight Codes for Correcting Symmetric Errors and Detecting Unidirectional Errors," *IEEE Transactions on Computers*, 42(11):1294-1302, Nov. 1993, 9 pages.
Maier, et al., "A 533-MHz BiCMOS Superscalar RISC Microprocessor", IEEE Journal of Solid-State Circuits, 32(11):1625-1634, Nov. 1997, 10 pages.
Daemen et al., "The Block Cipher SQUARE," Fast Software Encryption '97, Lecture Notes in Computer Science 1267, Springer-Verlag, Berlin Heidelberg, Germany, 1997, pp. 149-165,19 pages.
Brassard, Gilles, "On Computationally Secure Authentication Tags Requiring Short Secret Shared Keys," 1998, Springer-Verlag, pp. 79-86. 8 pages.
Tabor, Jeff F., "Noise Reduction Using Low Weight and Constant Weight Coding Techniques", Technical Report 1232, MIT Artificial Intelligence Laboratory, Dissertation, Massachusetts Institute of Technology, May 11, 1990, Cambridge, MA, 84 pages.
Takashima et al., "Noise Suppression Scheme for Gigabit-Scale and Gigabyte/s Data-Rate LSI's," *IEEE Journal of Solid-State Circuits*, vol. 33, No. 2, pp. 260-267, Feb. 1998, 8 pages.
Naccache, et al., "Cryptographic Smart Cards," IEEE Micro, vol. 16, No. 3, pp. 14-24, Jun. 1996,14 pages.
Nordman et al., "User Guide to Power Management for PCs and Monitors", Environmental Energy Technologies Division, Lawrence Berkeley National Laboratory, University of California, pp. 5, 9-14, Jan. 1997, Berkeley, CA, 8 pages.
Maier, Cliff, "High Speed Microprocessor Cache Memory Hierarchies for Yield-Limited Technologies" dissertation, Rensselaer Polytechnic Institute, Troy, New York, Aug. 1996, 212 pages.
Makie-Fukuda, et al., "Substrate Noise Reduction Using Active Guard Band Filters in Mixed-Signal Integrated Circuits", 1995 Symposium on VLSI Circuits, Digest of Technical Papers, 33-34, Jun. 8-10, 1995, 2 pages.
Maleki, et al., "Enhancement Source-Coupled Logic for Mixed-Mode VLSI Circuits", IEEE Transactions on Circuits and Systems-II: Analog and Digital Signal Processing, 39(6), Jun. 1992, pp. 399-402, 4 pages.
Oklobdzija, Vojin G., "Differential and Pass-Transistor CMOS Logic for High-Performance Systems", Proc. 21st International Conference on Microelectronics (MIEL '97), vol. 2, Nis, Yugoslavia, Sep. 14-17, 1997, pp. 803-810, 8 pages.
Schettler, et al., "A CMOS Mainframe Processor with 0.5-um Channel Length", *IEEE Journal of Solid-State Circuits*, 25(5), Oct. 1990, pp. 1166-1177, 12 pages.
Beker, et al., "Simplifying Key Management in Electronic Fund Transfer Point of Sale Systems," Electronics Letters, 19(12):442-444, Jun. 9, 1983, 3 pages.
Tallini, et al., "Design of Balanced and Constant Weight Codes for VLSI Systems", IEEE Transactions on Computers, vol. 47, No. 5, May 1998, pp. 556-572, 17 pages.
Texas Instruments Data Sheet, "SN54LS138, SN54S138, SN74LS138, SN74S138A: 3-Line to 8-Line Decoders/Demultiplexers", Texas Instruments, Dallas, Texas, Revised Mar. 1998, 5 pages.
Wang, et al., "On-Chip Decoupling Capacitor Design to Reduce Switching-Noise-Induced Instability in CMOS/SOI VLSI", *Proceedings 1995 IEEE International SOI Conference*, pp. 100-101, Oct. 1995, 2 pages.
Williams, et al., "Bipolar Circuit Elements Providing Self-Completion-Indication", *IEEE Journal of Solid-State Circuits*, 25(1):309-312, Feb. 1990, 4 pages.
Intel & Microsoft Corporations, "Advanced Power Management (APM); BIOS Interface Specification," Rev. 1.2, Feb. 1996, USA. pp. 4, 5, and 8, 3 pages.
Notice of Allowance in related U.S. Appl. No. 11/643,349, dated Sep. 28, 2009.
Notice of Allowance in related U.S. Appl. No. 09/930,836, dated Nov. 5, 2009.
EP Opposition for EP Application No. 99949533.6, May 15, 2008-Dec. 16, 2009, 98 pages, retrieved from European Patent website—https://register.eponline.org/espacenet.
EP Opposition for EP Application No. 99940799.2, Jan. 18-Dec. 18, 2008, pp. 1-315, retrieved from European Patent website—https://register.eponline.org/espacenet.
EP Opposition for EP Application No. 99940799.2, Jan. 18-Dec. 18, 2008, pp. 316-630, retrieved from European Patent Office website—https://register.eponline.org/espacenet.
EP Opposition for EP Application No. 98966880.1, Jan. 15, 2008-Nov. 17, 2009, pp. 1-476, retrieved from European Patent Office website—https://register.eponline.org/espacenet.
EP Opposition for EP Application No. 98966880.1, Jan. 15, 2008-Nov. 17, 2009, pp. 477-953, retrieved from European Patent Office website—https://register.eponline.org/espacenet.
EP Opposition for EP Application No. 98966880.1, Jan. 15, 2008-Nov. 17, 2009, pp. 954-1430, retrieved from European Patent Office website—https://register.eponline.org/espacenet.
EP Opposition for EP Application No. 98966880.1, Jan. 15, 2008-Nov. 17, 2009, pp. 1431-1669, retrieved from European Patent Office website—https://register.eponline.org/espacenet.
EP Opposition for EP Application No. 98966880.1, Jan. 15, 2008-Nov. 17, 2009, pp. 1670-1906, retrieved from European Patent Office website—https://register.eponline.org/espacenet.
EP Opposition for EP Application No. 99937153.7, Oct. 20, 2008-Jan. 21, 2010, 190 pages, https://register.eponline.org/espacenet.
Notice of Allowance in related U.S. Appl. No. 11/981,495, dated May 5, 2010.
Notice of Allowance in related U.S. Appl. No. 11/252,898, dated Mar. 30, 2010.
Communication from the European Patent Office regarding further examination for EP Application No. 08000796.6, dated Sep. 16, 2010, 4 pages.
Extended European Search Report in related European Patent Application No. 07075144.1-1237, dated Oct. 4, 2007, 5 pages.
Extended European Search Report in related European Patent Application No. 08000796.6-1525, dated Feb. 6, 2009, 6 pages.
Decision rejecting the opposition against European Patent No. 1084543, dated Oct. 6, 2009.
Decision to discontinue the opposition proceedings in European Patent No. 1088295, dated Aug. 26, 2009.
Communication from European Patent Office regarding further examination of the opposition(s) for EP Patent Application No. 99937153.7-1525 (EP Patent No. 1084543) dated Jul. 22, 2009.
Patentee's Observations on withdrawn NXP B.V. opposition in European Patent Application No. 99937153.7-1525 (1084543), filed Jun. 2, 2009.
Perry, Thomas J., "Assignment of Rights", between NXP and Thomas J. Perry with Exhibit A of communications including the participation of Thomas J. Perry, dated Feb. 3, 2007, Phoenix, AZ.
Stewart, Bill, "Assignment of Rights", between NXP and Bill Stewart with Exhibit A of communications including the participation of Bill Stewart, dated Dec. 12, 2006, Santa Clara, CA.
Cryptography Research, Inc., Observations on Oppositions to EP Application No. 99949533.6, dated Feb. 18, 2009, London, UK.

(56) References Cited

OTHER PUBLICATIONS

Cryptography Research, Inc., Observations on Oppositions filed to EP Application No. 1050133, dated Nov. 13, 2007.
European Patent Office, Summons to attend oral proceedings pursuant to Rule 115(1) EPC regarding EP Application No. 1050133, including the EPO's preliminary opinion, dated Jun. 16, 2008.
Cryptography Research, Inc., Oppositions to EP Application No. 1050133 of Cryptography Research, Inc., Submissions by the Proprietor in response to the Summons to attend Oral Proceedings dated Oct. 2, 2008.
NXP B.V., letter withdrawing its opposition to EP Application No. 1050133, dated Nov. 4, 2008.
Visa Europe Services, Inc. letter withdrawing its opposition to EP Application No. 1050133, dated Sep. 9, 2008.
Infineon Technologies AG; letter withdrawing its opposition to EP Application No. 1050133, dated Aug. 14, 2008.
Cryptography Research, Inc., letter from Aidan Robson to EPO regarding EP Application No. 1050133, dated Nov. 13, 2008.
European Patent Office "Communication of a Notice of Opposition", to European Patent No. 1084543 by NXP B.V., dated Oct. 31, 2008.
Notice & Grounds of Opposition of VISA Europe Services, Inc. against EP Patent No. 1050133, vol. 1, dated Feb. 2, 2007.
Notice of Opposition to European Patent of Infineon Technologies, AG, against EP Patent No. 1050133, dated Feb. 3, 2007 ( in German language).
Notice of Opposition to European Patent of NXP B.V. against EP Patent No. 1050133, dated Feb. 5, 2007.
Notice & Grounds of Opposition of VISA Europe Services, Inc. against EP Patent No. 1050133, vol. 2, dated Feb. 1, 2007.
Letter from Infineon Technologies, AG to the European Patent Office calling for the revocation of EP Patent No. 1050133, dated Feb. 3, 2007 (in English language).
Notice of Opposition to European Patent of NXP B.V. against EP Patent No. 1088295, dated May 15, 2008.
Letter from NXP B.V. to the European Patent Office concerning the Oral Proceedings against European Patent No. 1050133, dated Oct. 2, 2008.
Stewart, Bill, Declaration of Bill Stewart regarding his newsgroup posting on Dec. 13, 1995, signed in Mountain View, CA, Oct. 2, 2008.
Stewart, Bill, et al., "Announce: Timing cryptanalysis of RSA, DH, DSS", posting on Google Groups sci/crypt, Dec. 13, 1995, http://groups.google.de/group/sci.crypt/browse.
Stewart, Bill, "Potential defense against timing attack on Diffie-Hellman", postings on Cypherpunks, Dec. 12-13, 1995, http://diswww.mit.edu/menelaus/cpunks/45312.
Schneier, Bruce, *Applied Cryptography*, Second Edition: Protocols, Algorithms, and Source Code in C, Chap. 16.3, John Wiley & Sons, Inc. New York, NY, pp. 379-381.
Meyer, Carl H., et al., *Cryptography—A New Dimension in Computer Data Security*, John Wiley & Sons, New York, NY, 1982, pp. 100-105, 457-464, and 486.
Kocher, Paul, "Protection Against DPA and Related Attacks", *Electronics World*, Mar. 2008; United Kingdom pp. 32-36.
Black, Coral Elizabeth, "Witness Statement of Coral Elizabeth Black", Opposition: Cryptography Research, Inc.'s European Patent No. 1050133 B1, Jun. 26, 2008, setting the public divulgation date of a previously cited reference as Feb. 7, 1995, United Kingdom.
Brief Communication from the European Patent Office dated Aug. 11, 2008, enclosing "Further Submission on the Second Opponent's Opposition" to EP Patent No. 1150133 B1, dated Aug. 1, 2008, London, England.
Naccache, David, Declaration of Professor David Naccache, with regards to his attendance during Adi Shamir's talk entitled "How to Check Modular Exponentiation" at the rump session of Eurocrypt 1997, held May 13, 1997, Paris, France; date of reference: Dec. 6, 2006.

Grounds of Opposition, European Patent No. 1092297, in the name of Cryptography Research, Inc. , Opposition by VISA Europe Services, Inc. Jan. 25, 2008.
Posting on sci.crypt newsgroup, Kocher, Paul C. et al., "Announce: Timing cryptanalysis of RSA, DH, DSS" et al., messages 1-51 of 51, Dec. 11, 1995 through Dec. 24, 1995, http://groups,google.com/group/sci.crypt.
Piper, F., Key Management (Part 3.5) ZERGO: Information Security Training Club, Hampshire, U.K., Jan. 1993, Foils 6-18 to 6-30.
Piper, F., Declaration of Jan. 21, 2008, University of London, England.
American National Standard for Financial Services, secretariat—American Bankers Association (ANS/ABA X9.24-200x), Key Management Using Triple DEA and PKI, revised by Terry Benson, American National Standards Institute, Sep. 12, 2000.
Davies & Price, Security for Computer Networks: An Introduction to Data Security in Teleprocessing Electronic Funds Transfer, John Wiley & Sons, New York, NY, $2^{nd}$ Ed. 1989, 377 pages (entire book).
Defendant VISA International Service Association's Final Invalidity Contentions for U.S. Pat. No. 6,304,658 Pursuant to Patent L.R. 3-6(b), Feb. 8, 2008, Case No. C04-04143 JW(HRL), U.S. District Court, Northern District of California, San Jose Division.
Defendant VISA International Service Association's Final Invalidity Contentions for U.S. Pat. No. 6,381,699 Pursuant to Patent L.R. 3-6(b), Feb. 8, 2008, Case No. C04-04143 JW(HRL), U.S. District Court, Northern District of California, San Jose Division.
Defendant VISA International Service Association's Final Invalidity Contentions for U.S. Pat. No. 6,510,518 Pursuant to Patent L.R. 3-6(b), Feb. 8, 2008, Case No. C04-04143 JW(HRL), U.S. District Court, Northern District of California, San Jose Division.
Defendant VISA International Service Association's Final Invalidity Contentions for U.S. Pat. No. 6,654,884 Pursuant to Patent L.R. 3-6(b), Feb. 8, 2008, Case No. C04-04143 JW(HRL), U.S. District Court, Northern District of California, San Jose Division.
Larsson, Patrick, "di/dt Noise in CMOS Integrated Circuits", *Analog Integrated Circuits and Signal Processing*, 14: 113-129, Kluwer Academic Publishers, Boston, MA, 1997.
Loy, James R., "Managing Differential Signal Displacement", thesis, Rensselaer Polytechnic Institute, Troy, New York, Aug. 1993.
Schindler, Volker, "High Speed RSA Hardware Based on Low-Power Pipelined Logic", Dissertation, Institut fur Angewandte informationsverarbeitung and Kommunikationstechnologie, Graz University of Technology, Graz, Austria, Jan. 1997.
Schneier, Bruce, *Applied Cryptography*, Chapter 12, $2^{nd}$ Ed., 1996, John Wiley & Sons, pp. 265-301.
VISA International Service Association's Preliminary Invalidity Contentions, filed in Case C04-4143JW in U.S. District Court for N. District of California, San Jose Division, Jun. 2, 2005.
Menezes, et al., "CRC Handbook of Applied Cryptography", Boca Raton, Florida, CRC Press LLC, 1996, pp. 591-634.
VISA International Service Association's Final Invalidity Contentions for U.S. Pat. No. 6,278,783, filed in Case C04-4143 JW in U.S. District Court for the Northern District of California, San Jose Division, Jun. 28, 2007.
Meijer and Aki, "Digital Signature Schemes", May 1982, Extended summary of paper presented at CRYPTO 81, Santa Barbara, CA, Aug. 1981.
VISA International Service Association's Final Invalidity Contentions for U.S. Pat. No. 6,298,442, filed in Case C04-4143JW in U.S. District Court for the Northern District of California, San Jose Division, Jul. 16, 2007.
Brickell, et al., "Fast Exponentiation with Precomputation (Extended Abstract)", Springer-Verlag, 1998.
Gollman et al., "Redundant Integer Representations and Fast Exponentiation", Designs, Codes and Cryptography, 7, 135-151, Kluwer Academic Publishers, 1996 Boston, MA.
Defendant VISA International Service Association's Final Invalidity Contentions for U.S. Pat. No. 6,539,092, filed in Case C04-4143JW, Nov. 21, 2007, in U.S. District Court for N. District of California, San Jose Division, including Exhibits A through C17.
Bradley, S., Some Applications of Mathematics to the Theory of Communications; PhD Thesis, University of London, 1994.

(56) References Cited

OTHER PUBLICATIONS

ISO—11568-2 and 11568-3, Dec. 1, 1994.
ANSI X9.24—Derived Unique Key Per Transaction ("DUKPT"), 1998.
Extracts from Handbook of Applied Cryptography 1997 (sections 2.143 (p. 71), 13.9 (p. 586), and 15.2.1 (pp. 636-637).
Extracts from PIN Manual—A Guide to the Use of Personal Identification Numbers in Interchange, Interbank Card Association, 1979, p. 61 onwards.
Blum, L. et al., "A Simple Unpredictable Pseudo-Random Number Generator", *Siam J. Comput.*, 13(2):364-383, May 1986.
Related U.S. Appl. No. 11/981,495, filed Oct. 30, 2007, now U.S. Pat. No. 7,792,287, issued Sep. 7, 2010.
Related U.S. Appl. No. 11/978,364, filed Oct. 29, 2007, now U.S. Pat. No. 7,599,488, issued Oct. 6, 2009.

\* cited by examiner

CRYPTOGRAPHIC TOKEN WITH LEAK-RESISTANT KEY DERIVATION

CROSS-REFERENCE TO RELATED APPLICATIONS

This application is a continuation of U.S. application Ser. No. 13/010,034, filed Jan. 20, 2011, which is a continuation of U.S. application Ser. No. 11/977,392, filed Oct. 24, 2007, which is a continuation of U.S. application Ser. No. 10/396,975, filed Mar. 24, 2003 now U.S. Pat. No. 7,941,666, which is a continuation of U.S. application Ser. No. 09/347,493, filed Jul. 2, 1999 now U.S. Pat. No. 6,539,092, issued as U.S. Pat. No. 6,539,092 on Mar. 25, 2003, which claims the benefit of U.S. Provisional Application No. 60/091,644, filed Jul. 2, 1998, each of which is incorporated in its entirety by this reference thereto.

BACKGROUND OF THE INVENTION

Technical Field

This patent discloses techniques for securing payment devices, and more specifically to methods and apparatuses for securing payment cards against external monitoring attacks. This patent also discloses methods and apparatuses for increasing the leak-resistance of a portable cryptographic token.

Description of the Background Art

Attackers who gain access to cryptographic keys and other secrets can potentially perform unauthorized operations or forge transactions. Thus, in many systems, such as smartcard-based electronic payment schemes, secrets need to be protected in tamper-resistant hardware. However, recent work by Cryptography Research has shown that smartcards and other devices can be compromised if information about cryptographic secrets leaks to attackers who monitor devices external characteristics such as power consumption or electromagnetic radiation.

In both symmetric and asymmetric cryptosystems, secret parameters should be kept confidential, since an attacker who compromises a key can decrypt communications, forge signatures, perform unauthorized transactions, impersonate users, or cause other problems. Methods for managing keys securely using physically secure, well-shielded rooms are known in the background art and are widely used today. However, previously known methods for protecting keys in low-cost cryptographic devices are often inadequate for many applications, such as those with challenging engineering constraints (cost, size, performance, etc.) or that require a high degree of tamper resistance. Attacks such as reverse-engineering of ROM using microscopes, timing attack cryptanalysis (see, for example, P. Kocher, "Timing Attacks on Implementations of Diffie-Hellman, RSA, DSS, and Other Systems," Advances in Cryptology-CRYPTO '96, Springer-Verlag, pages 104-113), and error analysis (see, for example, E. Biham and A. Shamir, "Differential Fault Analysis of Secret Key Cryptosystems," Advances in Cryptology-CRYPTO '97, Springer-Verlag, 1997, pages 513-525) have been described for analyzing cryptosystems.

Key management techniques are known in the background art for preventing attackers who compromise devices from deriving past keys. For example, ANSI X9.24, "Financial services—retail management" defines a protocol known as Derived Unique Key Per Transaction (DUKPT) that prevents attackers from deriving past keys after completely compromising a device's state. Although such techniques can prevent attackers from deriving old keys, they have practical limitations and do not provide effective protection against external monitoring attacks in which attackers use partial information about current keys to compromise future ones.

Cryptography Research has also developed methods for using iterated hashing operations to enable a client and server to perform cryptographic operations while the client protects itself against external monitoring attacks. In such methods, the client repeatedly applies a cryptographic function to its internal secret between or during transactions, such that information leaked in each of a series of transactions cannot be combined to compromise the secret. However, the system described has a disadvantage in that the server must perform a similar sequence of operations to re-derive the symmetric session key used in each transaction. Thus, in cases such as where there are a large number of unsynchronized server devices (such as electronic cash applications where a large number of merchant terminals operate as independent servers) or if servers have limited memory, the server cannot reliably precompute all possible session keys clients might use. As a result, transaction performance can suffer since a relatively large number of operations may be required for the server to obtain the correct session key. For example, the n-th client session key can require n server operations to derive. A fast, efficient method for obtaining leak-resistant and/or leak-proof symmetric key agreement would thus be advantageous.

SUMMARY OF THE INVENTION

This patent describes ways to make smartcards (and other cryptographic client devices) secure even if attackers are able to use external monitoring (or other) attacks to gather information correlated to the client device's internal operations. In one embodiment, a cryptographic client device (e.g., a smartcard) maintains a secret key value as part of its state. The client can update its secret value at any time, for example before each transaction, using an update process that makes partial information that may have previously leaked to attackers about the secret no longer (or less) usefully describe the new updated secret value. (Information is considered useful if it can help or enable an attacker to implement an actual attack.) Thus, the secret key value is updated sufficiently frequently (perhaps as often as once per transaction) such that information leaked about the input state does not as usefully describe the updated state. By repeatedly applying the update process, information leaking during cryptographic operations that is collected by attackers rapidly becomes obsolete. Thus, such a system can remain secure against attacks involving repeated measurements of the device's power consumption or electromagnetic characteristics, even when the system is implemented using leaky hardware and software (i.e., that leak information about the secret values). (In contrast, traditional systems use the same secret value repeatedly, enabling attackers to statistically combine information collected from a large number of transactions.)

The techniques disclosed herein can be used in connection with a client and server using such a protocol. To perform a transaction with the client, the server obtains the client's current transaction counter (or another key index value). The server then performs a series of operations to determine the sequence of transformations needed to re-derive the correct session key from the client's initial secret value. These transformations are then performed, and the result is used as a transaction session key (or used to derive a session key).

A sequence of client-side updating processes can allow for significant improvements in the performance of the corresponding server operations, while maintaining leak-resistant and/or leak-proof security characteristics in the client device. In one embodiment, each process in the sequence is selected from among two forward cryptographic transformations ($F_A$ and $F_B$) and their inverses ($F_A^{-1}$ and $F_B^{-1}$). Using methods that will be described in detail below, such update functions are applied by the client in a sequence that assures that any single secret value is never used or derived more than a fixed number of times (for example, three). Furthermore, the update functions and sequence also assure that the state of (and hence the secret session key value used in) any transaction is efficiently derivable from a starting state (such as the state used in the first transaction) within a small number of applications of $F_A$ and $F_B$ (or their inverses).

If the number of operations that can securely be performed by a client is n (i.e., n different transactions can be performed, without using the same secret value more than a fixed number of times), a server knowing or capable of obtaining the client's initial secret value K (or initial state corresponding thereto) can derive any resulting secret value (or corresponding state) in the series of transactions significantly faster than by performing n corresponding updates. Indeed, the state for any given transaction can often be derived by a server using 0(log n)calculations of $F_A$ and $F_B$ (or their inverses). If the system designer has made n sufficiently large, this can allow a virtually limitless set of transactions to be performed by clients while providing excellent server performance.

DETAILED DESCRIPTION OF THE INVENTION

Indexed Key Management

The techniques disclosed herein can enable parties to perform cryptographic operations with increased security against external monitoring attacks. Although exemplary embodiments are described involving two parties, a "client" and a "server", the terms "client" and "server" are chosen for convenience and might not necessarily correspond directly to any particular role in a system design. For example, the client could be a smartcard, and the server could be a mainframe computer, or vice versa. Furthermore, although most cryptographic operations involve two parties (e.g., one at the client and one at the server), the techniques can, of course, be applied in environments involving only one party (such as in secure memory or storage systems in which both client and server are under a single party's control or are combined in a single device) or in environments involving more than two parties and/or devices.

In an exemplary embodiment, the client is initialized with a secret key $K_0$ for a symmetric cryptosystem, where $K_0$ is also known to (or derivable by) the server. The key $K_0$ is usually (but not necessarily) specific to a particular client device or party. The client also has a (typically non-secret) index or transaction counter C, which may be initialized to zero. An additional parameter is an index depth D. The value of D may also be non-secret, and (for example) may be client-specific or may be a system-wide global constant. The value of D determines the cycle length of the key update process.

Figure 1:
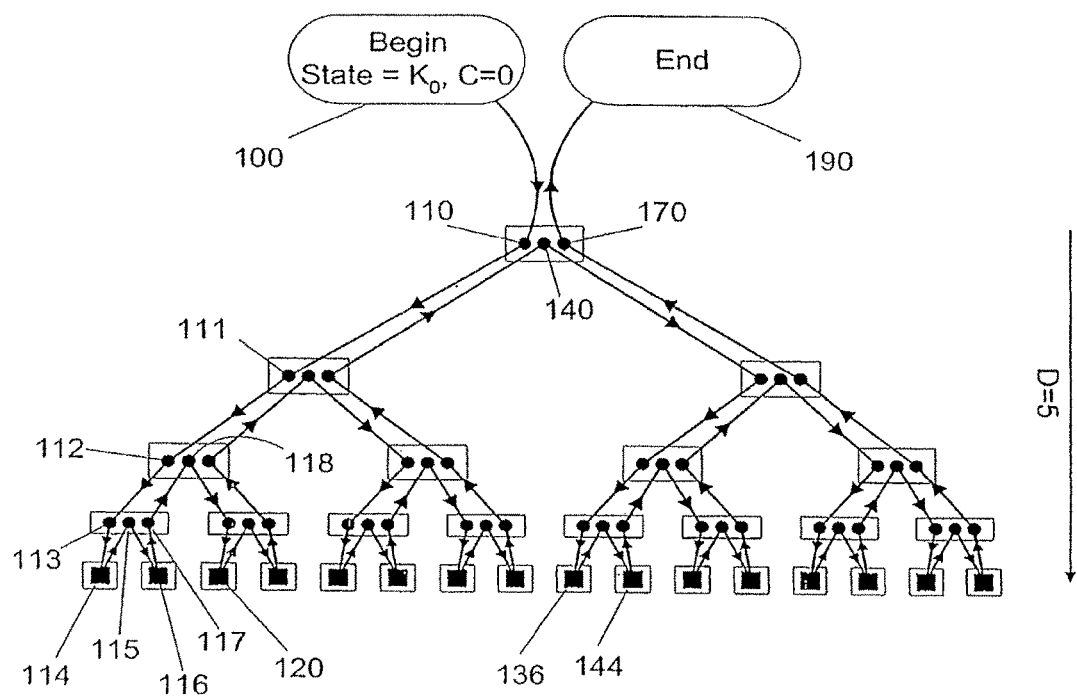
FIG. 1 shows an exemplary embodiment of a key update process through a series of transactions.

FIG. 1 shows an exemplary sequence of client device secret state values usable to perform a series of transactions, typically (but not necessarily) using one state per transaction. (The client process used to produce the sequence will be described with respect to FIG. 2 and the corresponding server process will be described with respect to FIG. 3.) A state's secret value typically, but not necessarily, includes a secret session key; therefore, as a matter of convenience, the secret value will be denoted by K and the term "secret value" may be used somewhat interchangeably with "key." Nevertheless, those skilled in the art will appreciate that they may be different in the general case. Also for clarity of exposition, the figure is drawn showing an exemplary key update process with D=5, meaning that five levels of key values are present. However, there is no specific limitation on D, and those skilled in the art will readily understand how the general principles underlying the exemplary embodiment can be used for other such cycle lengths. Indeed, commercially deployed systems would normally use larger values for D.

Each of the boxes in the figure represents a value of the secret value ($K_C$). Thus, multiple dots in a box represent different states sharing the same secret value $K_C$. The top row (row 0) of the figure contains one box, which corresponds to the initial state $K_0$ 110 as well as subsequent states $K_{30}$ 140 and $K_{60}$ 170, all of which share the same secret value $K_C$. The next row (row 1) contains two boxes, the left of which corresponds to a trio of states ($K_1$ 111, $K_{15}$, and $K_{29}$) sharing the same secret value, and the right box in the second row corresponds to a second trio of states ($K_{31}$, $K_{45}$, and $K_{59}$) sharing yet another secret value. Similarly, row 2 contains four boxes, representing a total of twelve states of which 4 trios each share among themselves the same secret value. More generally, in this exemplary embodiment, row N (where N<D−1) contains $2^N$ boxes (or unique secret values) and $3(2^N)$ states, and the last row (N=D−1) contains $2^N$ boxes and $2^N$ states. The thicker (curved) path diagrams the process by which the states are updated, starting from the initial state 110 and continuing through to the final state 170. As the states are updated, counter C is also updated (by one for each update).

The exemplary state update processes involve two functions ($F_A$ and $F_B$), and their inverses ($F_A^{-1}$ and $F_B^{-1}$), for a total of four functions. At step 100, the client is initialized or personalized with a starting counter C=0 and a starting state having a starting secret value $K_C$=$K_0$. At step 110, the device performs the first transaction, using $K_C$ (or a key derived from $K_C$). The key can be used in virtually any symmetric cryptographic transaction. (For example, such a transaction could involve, without limitation, computing or verifying a MAC (Message Authentication Code) on a message, encrypting or decrypting a message, producing a pseudo-random challenge value, deriving a key, etc. Examples of messages include, without limitation, data specifying the amounts of funds transfer operations, e-mail messages, challenge/response authentication data, parameter update authorizations, code updates, audio messages, digitized images, etc.)

After step 110, the client device's secret value $K_C$ is updated by applying the function $F_A$ and the counter C is incremented, i.e. by performing C←C+1 and $K_C$←$F_A(K_C)$. (Thus, at step 111, C=1 and $K_C$=$F_A(K_0)$.). The updated value of $K_C$ is used to perform a transaction at step 111. After step 111, C is incremented again and $F_A$ is again applied to $K_C$, i.e. by performing C←C+1 and $K_{C=2}$←$F_A(K_C)$, yielding the secret key used at step 112. The same pair of operations (C←C+1 and $K_C$←$F_A(K_C)$) are similarly applied between steps 112 and 113, and between steps 113 and 114.

The transaction at step 115 should use the same value of $K_C$ as did the transaction at step 113, since steps 113 and 115 are shown in the same box. Thus, after the transaction at step 114 the update process is performed by computing C←C+1 (yielding C=5) and $K_{C=5}$←$F_A^{-1}(K_C)$. Note that $K_{C=5}$=$F_A^{-1}$($K_{C=4}$)=$F_A^{-1}(F_A(K_{C=3}))$=$K_{C=3}$. Thus, the value of $K_C$ used at step 115 is the same as the value used at step 113. After the transaction at step 115, $K_C$ is updated using function $K_B$ by incrementing C and computing $K_{C=6}$←$F_B(K_C)$. After the transaction at step 116, the secret value for transaction 117 is computed by applying the function $F_B^{-1}$ to $K_C$.

The update process operates such that after each transaction, a key state update process is performed. The key update involves incrementing C and applying one of the functions $F_A$, $F_B$, $F_A^{-1}$, or $F_B^{-1}$ to the state $K_C$. The use of invertable functions allows a first state and a second state to share the same secret value, where the first state precedes entry into a child (lower level) box from a parent (upper level) box, and the second state is created by reentry into the parent box from the child box. Further, the multiplicity of functions (e.g., $F_A$ and $F_B$ in the exemplary embodiment) allows the creation of multiple child boxes from each parent box and, hence, a large number of allowable states before the sequence is exhausted (e.g., at end state 190). In going from one particular state to another particular state, the choice of functions (e.g., in the exemplary embodiment of FIG. 1, whether to use $F_A$, $F_B$, $F_A^{-1}$, or $F_B^{-1}$) depends on the current direction and location of the two particular states. In particular, referring again to the exemplary embodiment shown in FIG. 1, when moving downward from a parent box to the left-hand child, such as between steps 112 and 113, $F_A$ is applied by computing $K_C$←$F_A(K_C)$. Further, when moving downward from a parent box to the right-hand child, such as between steps 115 and 116, $F_B$ is applied. Still further, when moving from a left-hand child to its parent, such as between steps 114 and 115, $F_A^{-1}$ is applied by computing $K_C$←$F_A^{-1}(K_C)$. Finally, when moving from a right-hand child to its parent, such as between steps 116 and 117, $F_B^{-1}$ is applied. More generally, the choice of which function to apply in any particular state transition can be determined solely as a function of C, so the client need not maintain any information beyond its current state and its current counter value. This will be explained in greater detail in the section "Client Side Indexed Key Update," below, in the context of the exemplary embodiment of FIG. 1.

Eventually, the client may reach a point at which the entire table has been traversed. For example, the end of the process of FIG. 1 is reached at step 170, where C=60. After this transaction (or at an earlier point if the table length exceeds the maximum number of transactions allowed by the system), the client device could, and might typically, disable itself, such as by deleting its internal secrets. However, other actions may be preferable in some cases (e.g., by repeating back to step 110, entering a state in which rekeying is required, etc.). In the illustrated exemplary embodiment, the number of transactions that can be performed before the end of the process occurs is equal to $$2^{D-1} + \sum_{i=0}^{D-2} 3(2^i) = 2^{D-1} + 3(2^{D-1} - 1) = 2^{D+1} - 3.$$

(In the example with D=5, there can thus be $2^6$−3=61 transactions.) By choosing a sufficiently large value for D, a system designer can make the maximum number of transactions so large that the "end" will never be reached. For example, D=39 will allow more than 1 trillion ($10^{12}$) transactions without repeating.

Client-Side Indexed Key Update

Figure 2:
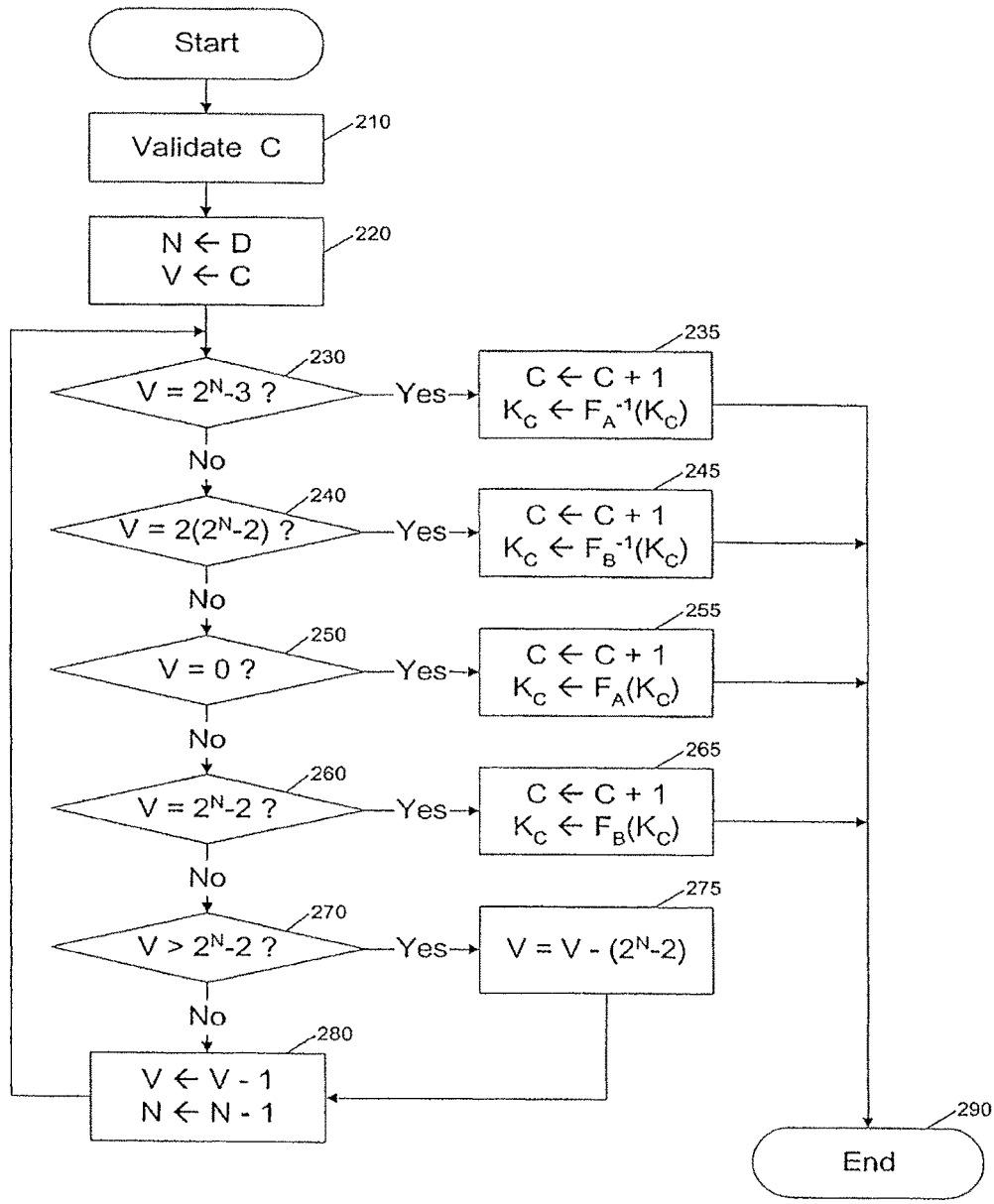
FIG. 2 shows an exemplary client-side indexed key update process.

For the exemplary embodiment of FIG. 1, the processes of incrementing C and choosing which function to apply ($F_A$, $F_B$, $F_A^{-1}$, or $F_B^{-1}$) can be performed by the client as shown in FIG. 2. At step 210, the client device verifies that C is valid, for example by confirming that C is non-negative and that C is less than $2^{D+1}$−3. (If C is invalid, then the transaction fails or other appropriate action is taken.) Since the client maintains C&P internally, step 210 can be omitted if the client is confident that C is valid. At step 220, the device initializes temporary depth and counter variables, N and V, with the values stored in D and C, respectively.

At step 230, the device tests whether the variable V is equal to the quantity $2^N$−3. If equal, function $F_A^{-1}$ should be applied, and processing proceeds to step 235 where the device increments C and updates $K_C$ by computing $K_C$←$F_A^{-1}(K_C)$. Otherwise, at step 240, the device tests whether the variable V is equal to the quantity $2(2^N-2)$. If equal, function $F_B^{-1}$ should be applied, and processing proceeds to step 245 where the device increments C and updates $K_C$ by computing $K_C$←$F_B^{-1}(K_C)$. Otherwise, at step 250, the device tests whether the variable V is equal to zero. If equal, function $F_A$ should be applied, and processing proceeds to step 255 where the device increments C and updates $K_C$ by computing $K_C$←$F_A(K_C)$. Otherwise, at step 260, the device tests whether the variable V is equal to the quantity $2^N$−2. If equal, function $F_B$ should be applied, and processing proceeds to step 265 where the device increments C and updates $K_C$ by computing $K_C$←$F_B(K_C)$ by At step 270, the device checks whether the value of V exceeds $2^N$−2. If not, processing proceeds directly to step 280. If V is larger than $2^N$−2, the value of V is diminished by $2^N$−2 and processing proceeds to step 280. At step 280, V and N are each decremented, then processing proceeds to step 230.

After performing a state update function at step 235, step 245, step 255, or step 265, the client process terminates successfully at step 290. After the successful conclusion of the process of FIG. 2, the secret value $K_C$ is used to perform a cryptographic transaction (or derive a key used to perform the transaction, for example by hashing or encrypting $K_C$, appending a salt or nonce, etc.).

Note that each iteration of the process of FIG. 2 corresponds to moving down one level in the drawing of FIG. 1, until the correct update operation is determined. Thus, the number of iterations of the loop cannot exceed D. Except for the key update functions (in the exemplary embodiment, $F_A$, $F_B$, $F_A^{-1}$ or $F_B^{-1}$), implementations of the function selection process need not be at all leak resistant; the function selection process of FIG. 2, its input value (i.e., C), and the choice of update functions need not be secret. Finally, as mentioned earlier and illustrated above in the case of the exemplary embodiment, the selection of which function to apply in any particular state transition can be characterized solely as a function of C, so the client need not maintain any information beyond its current state and its current counter value.

Server-Side Indexed Key Derivation

Figure 3:
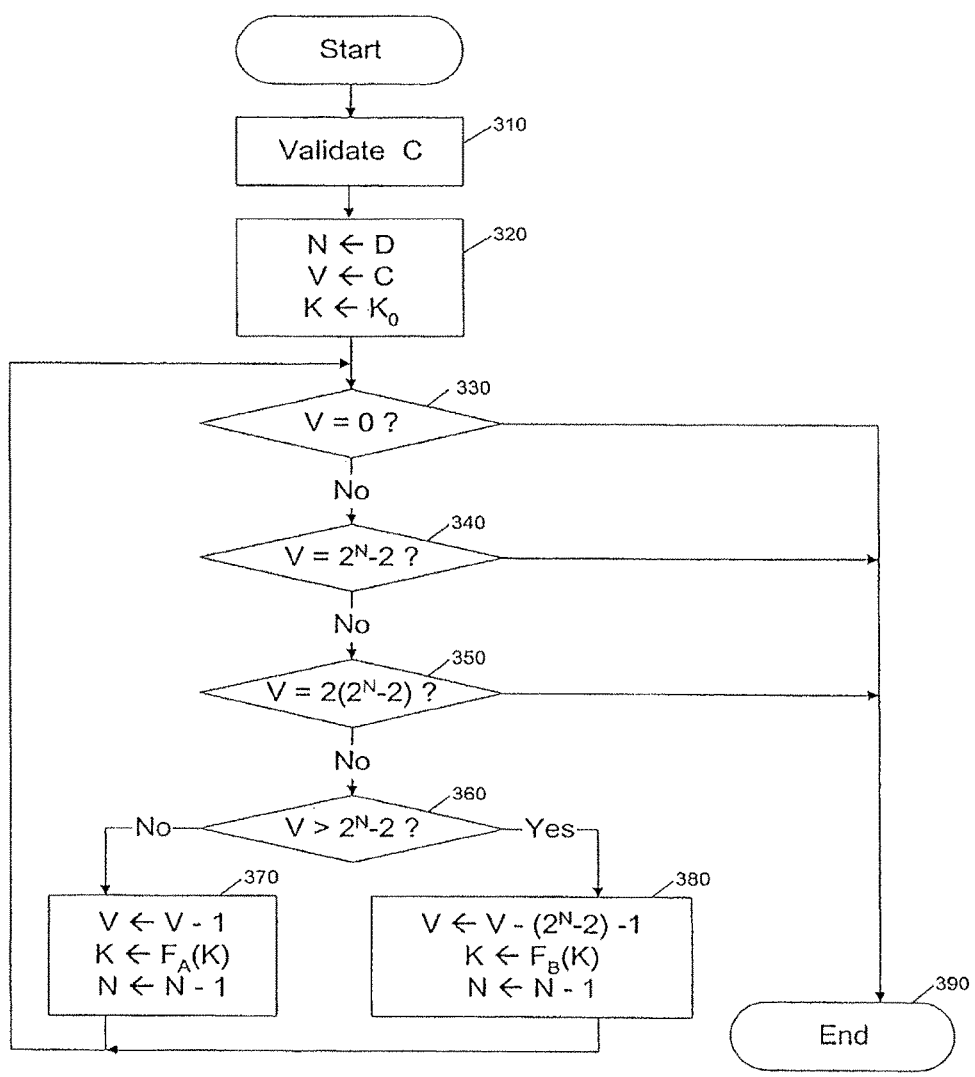
FIG. 3 shows an exemplary server process for deriving a transaction key from a key index and base key.

FIG. 3 shows an exemplary server-side process compatible with the exemplary client-side process of FIG. 2. Prior to commencing the process of FIG. 3, the server obtains; the client's counter value C (typically by receiving C from the client device via a digital I/O interface), which is used as a key index. (In this exemplary embodiment, a transaction counter is used as a key index, but alternate embodiments can use a different value or representation of the key index.) The server also obtains the client's base key value $K_0$ (for example, by retrieving $K_0$) from the server's memory, by cryptographically deriving $K_0$ using other secret keys or secret algorithms, by obtaining $K_0$, from a third party such as a key server, etc.). The server also knows or obtains D. At step 310, the server validates C to reject any possible invalid values of C. At step 320, the temporary variables N, V, and K are initialized with the values of D, C, and $K_0$, respectively. At step 330, the server checks; whether the value of V is equal to zero. If so, the value of K equals the client's current secret ($K_C$), and the process concludes at step 390. Otherwise, processing continues to step 340 where the server tests whether V equals the value $2^N-2$. If so, the value of K equals the client's current secret ($K_C$), and the process concludes at step 390. Otherwise, processing continues to step 350 where the server tests whether V equals the value $2(2^N-2)$. If so, the value of K equals the client's current secret ($K_C$), and the process concludes at step 390. Otherwise, at step 360, the server checks whether V is larger than $2^N-2$. If not, processing continues at step 370 where V is decremented, K is updated by applying $F_A$ (i.e., $K \leftarrow F_A(K)$), and N is decremented. If the test at step 360 reveals that V is larger than $2^N-2$, processing continues to step 380, where the value $2^N-1$ is subtracted from V, K is updated by applying $F_B$ (i.e., $K \leftarrow F_B(K)$), and N is decremented. After either step 370 or step 380, processing continues at step 330. Processing continues until step 330, step 340, or step 350 indicates completion. When the process of FIG. 3 completes at step 390, the value contained in the variable K is equal to the value of $K_C$ at the client for counter value C. The client and server can thus use $K=K_C$ to secure a cryptographic transaction. If an error or error-causing attack occurs, K and $K_C$ will differ and the cryptographic transaction should fail.

State Transformation Operations

The above discussion involved the exemplary cryptographic operations $F_A$ and $F_B$, and their inverses $F_A^{-1}$ and $F_B^{-1}$, which will now be described in greater detail. A variety of such functions can be used, and the most appropriate form for these functions depends on the requirements and characteristics of the system.

Figure 4:
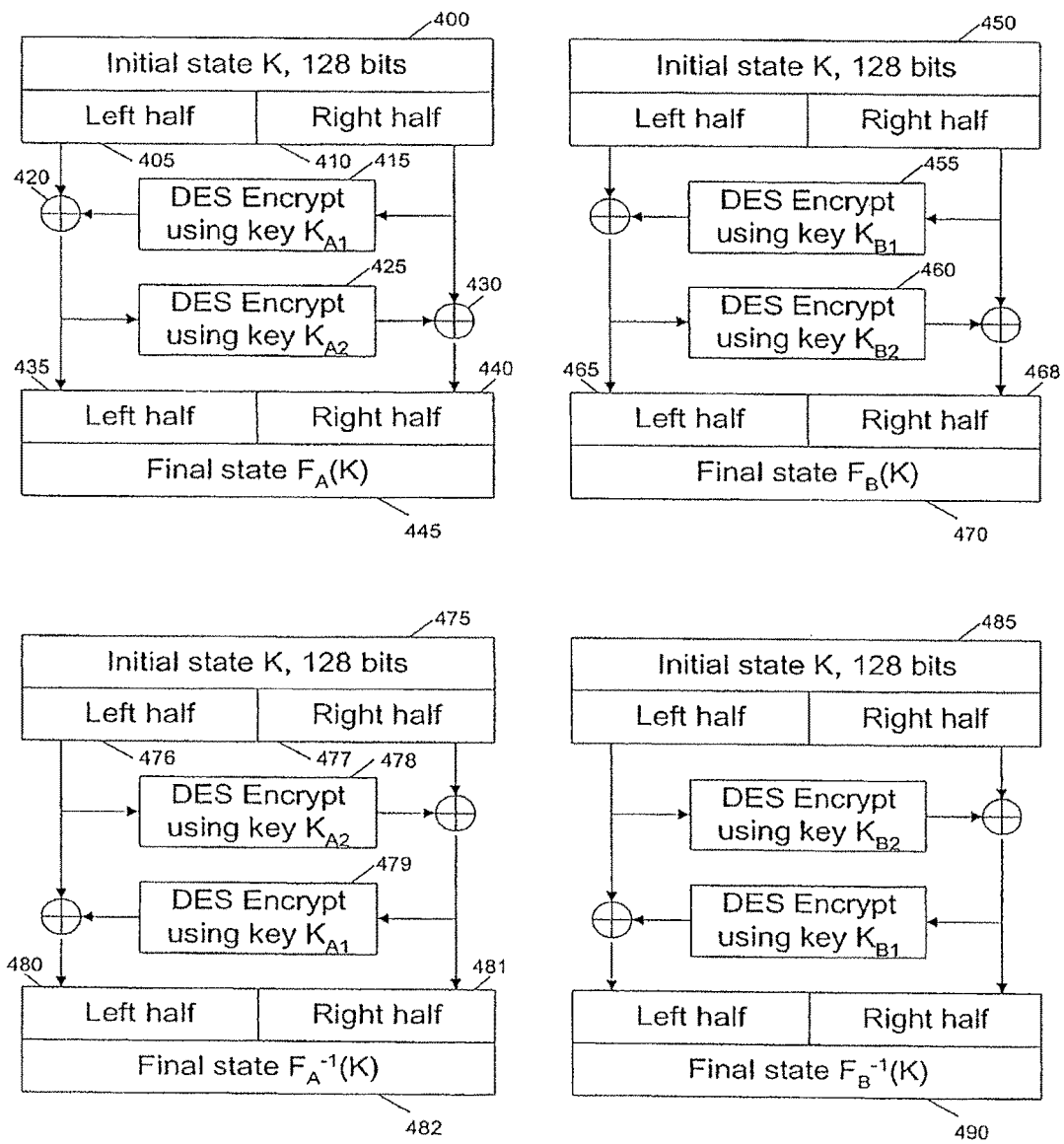
FIG. 4 shows exemplary embodiments of four state transformation operations.

In the exemplary functions shown in FIG. 4, the input and output of each function is 128-bits in size. For the function $F_A$, input state 400 is divided into a left half 405 and right half 410, which are each 64 bits. The right half is provided as the input to a DES operation 415, which encrypts its input (right half 410) using a fixed key $K_{A1}$. The DES operation is only used as a nonlinear transformation that decreases or eliminates the usefulness of partial information an attacker might have about the input. Consequently, the key $K_{A1}$ does not need to be secret and can be a published constant. At operation 420, the result of the DES encryption is XORed onto the left half of the input. The result of the XOR becomes both the result left half 435 and the input to a second DES operation 425. The second DES operation uses key $K_{A2}$ to produce a result which, at operation 430, is XORed with the input right half 410. The XOR result becomes the result right half 440. The result left half 435 and result right half 440 are combined to produce the final result 445.

The structure of the function $F_B$ can be essentially identical, except that different keys are used. In particular, the first DES operation 455 encrypts the right half of input 450 using key $K_{B1}$, and DES operation 460 encrypts the XOR of the left half and the first DES result using key $K_{B2}$. As with $F_A$, the result left half 465 and right half 468 are combined to produce the final result 470.

The function $F_A^{-1}$ (the inverse of $F_A$) is computed using similar functions as $F_A$ but in the opposite order. The input 475 is divided into a left half 476 and right half 477. At DES operation 478, the left half 476 is encrypted using the DES key $K_{A2}$, and the result is XORed with the right half 477. The XOR result becomes the result right half 481 and is used as the input to DES operation 479 which encrypts using the key $K_{A1}$. The result of the second DES operation 479 is XORed with the input left half 476 to produce the result left half 480. Finally, the result left half 480 and right half 481 are combined to produce the final result 482. The function $F_B^{-1}$ is similar to $F_A^{-1}$ except that the input 485 is transformed into output 490 using keys $K_{B2}$ and $K_{B1}$ instead of $K_{A2}$ and $K_{A1}$.

The primary objective of the functions $F_A$, $F_B$, $F_A^{-1}$, and $F_B^{-1}$ is to destroy the usefulness of partial information about the input that might have been obtained by an attacker. For example, the DES operations used in the exemplary function $F_A$ shown in FIG. 4 make the function extremely nonlinear. An attacker with statistical information about the value of each of the 128 input bits (such as a guess of the bit's value that is correct with probability slightly greater than 0.5) will have statistical information about the input to the first DES operation 415. However, the DES output will be effectively randomized—even though attackers might know the DES key $K_{A1}$. The two DES operations in each update process "mix" the entire input state.

Thus partial statistical information about individual DES input bits does not provide useful statistical information about the DES output bits, provided that attackers never gain enough information to be able to guess the transformation operation entire input.

Other Embodiments

FIG. 4 shows just one exemplary set of functions for $F_A$ and $F_B$; many other variant or alternate designs can be used. For example, functions produced using additional rounds can be used (for example, a 3-round Luby-Rack off block cipher). More generally, encryption and decryption using any block cipher can be used for the functions and their inverses. The basic functions used to construct the update function only need to prevent partial information leaked about the input from providing useful information about the output, so the functions do not necessarily need to be cryptographically hard to invert. For example, reduced-round variants of DES can be used. Further, although $F_A$ and $F_B$ in FIG. 4 have similar structure, this is not necessary. $F_A$ and $F_B$ can also be selected or modified depending on the state position (for example by using different functions or modified functions for each of the D levels):

Other types of functions can be used for $F_A$ and $F_B$. For example, if the input state is an odd value between 0 and $2^B$, $F_A$ and $F_B$ could be implemented using multiplication modulo $2^B$ with odd constants and the inverse functions could be implemented using multiplication with the constants' inverses also mod $2^B$. (Of course, other operations such as multiplication with prime moduluses can also be used.) The foregoing are provided as examples only; one of ordinary skill in the art will appreciate that a wide variety of other functions exist that can be used to implement functions $F_A$, $F_B$, $F_A^{-1}$, and $F_B^{-1}$.

For additional leak resistance, larger states can be used, for example a 256-bit state can be implemented by using four 64-bit blocks and using four (or more) DES operations to update the state, or by using two (or more) applications of a 128-bit hash function.

In alternate embodiments, other key update processes can be used. For example, by using more than two update functions (and their inverses), each parent state can have more than 2 child states. In fact, parents can have any number of child states, although as the number of child states increases, the number of cryptographic operations involving the parent state value, and the number of states sharing the same secret key, also increase; thus potentially increasing attackers' opportunity to attack the system.

The type of state updating process illustratively described with respect to FIG. 1 is advantageous because it uses very little memory and very little processing overhead, while the maximum number of transactions using the same secret value is small. (The more often such secret values are used, the greater the likelihood of successful external monitoring attack.) Therefore, in an alternate embodiment, transactions are performed using only the states at the lowest level of the diagram (which are produced only once), so that secret values are not reused. This reduces the opportunity for information to leak, but increases the processing overhead per transaction to an average of about four updates. (Also, the amount of time per transaction is not exact, since the number of update processes ranges from 2 to 2D−2. However, this is often not a problem, since few applications will ever need values of D larger than about 40 and many devices can perform thousands of cryptographic operations per second.)

In yet another alternate embodiment, the client can cache a value at each vertical level or row. By caching higher-up values, it is not necessary to perform inverse operations, but slightly more memory is required. In such an embodiment, an average of two applications of $F_A$ or $F_B$ (which, in such an embodiment, do not need to have easy inverse functions) are required per operation if only bottom-level (single-use) states are used for transactions. A diagram of the state update processes for such an implementation would resemble a hash tree. For implementations requiring constant-time or more predictable performance, the additional processing time available during operations requiring only a single application of $F_A$ or $F_B$ can be used to precompute values that will be needed in the future, and thereby limit the execution time to two $F_A$ or $F_B$ operations per transaction.

In still other embodiments, the key index used by the server can be a value other than a transaction counter, since all the server requires is information sufficient to derive the current transaction key from the root key.

In some applications, C can be incremented periodically (e.g., if C is driven by a timer) or by some event other than transactions being performed. In such embodiments, if the client (or server) fails to correctly update C and derive the corresponding updated key, the transaction will fail. If the first value of C that is tried by the client (or server) fails, other likely session key values (such as those with close values of C) can be tried. (Of course, if the client and server versions of C diverge too far, the transaction will not proceed.) While the key index (e.g., C) is normally exchanged explicitly, in cases such as this the server might be able to guess or obtain C indirectly.

If both the client and server need to be secured against external monitoring attacks, the transaction can be performed using the larger of the two parties' transaction counters C. In particular, the client and server can exchange counter values, and (if the counters are not equal) each device can set its counter value to equal the larger of its value and the received value. The device with the lower value updates its secret to derive the appropriate transaction key. This update can be implemented by applying a combination of the usual update functions and their inverses. (For example, referring to the technique exemplified in FIG. 1, a client at state 117 could skip to state 136 by applying $F_A^{-1}$ twice then applying $F_B$ three times. In general, the total number of update functions required should be less than 2D−1. This "fast-forward" capability maintains the property that no state is used or derived more than a finite number of—here three—times.) In devices implementing this capability, care should be taken to assure that the system will not fail if a large, incorrect value of C is encountered. (For example, devices can reject excessively large jumps in C or can require additional cryptographic authentication, for example of the most significant bits of C.) Such a protocol can be used to agree on a transaction counter for embodiments involving more than two parties in cryptographic transactions.

Finally, the actual value used for the transaction key can be the value produced from the transformation function, or a value derived from the transformation result can be used. For example, the transformation result can be encrypted or hashed to produce the session key. A hashing step can help to limit the number of operations performed with any given key and thus help to limit the amount of information about the key that can leak to attackers. Alternatively or additionally, additional hashing operations can be performed periodically during the use of the session key, or fresh session keys can be required periodically.

To observe the largest possible number of transactions with a given secret key, an attacker might try to reset a target device before the device's memory can be updated with the new value of $K_C$ (e.g., during or immediately after the computation of $F_A$ or $F_B$). However, such a reset does not necessarily mean an attack is in progress, since resets can occur during the normal operation of many systems. (For example, power can be lost if a smartcard is removed during a transaction.) Therefore, in a preferred embodiment, a failure counter stored in nonvolatile memory is updated prior to each update process. Before the update begins, the counter is tested to determine whether the number of sequential failures exceeds a maximum value and, if not, the transaction proceeds normally. Once the new value of $K_C$ has been computed and safely written to memory and C has been incremented, the failure counter is reset. The probability that the counter threshold will be exceeded during normal operation of the device (i.e., when no attack is in progress) will be small, particularly if the update process is rapid.

The exemplary key update process described with regard to FIGS. 1, 2, and 3 assures that no secret key value is ever used in more than a relatively small number of (here, three) transactions. Attackers thus have the opportunity to collect information about the secret state during the three transactions themselves, the three key update processes that produce the transaction keys, and the three update processes that transform the transaction keys after the transactions. Implementers should make sure that the total amount of information about the secrets that leaks to attackers during these processes is not enough to compromise the secret state. When characterizing a design, it is often useful to determine or estimate the maximum amount of information that can leak from each transaction without compromising security.

Other Considerations

Cryptographic operations should normally be checked to ensure that incorrect computations do not compromise keys or enable other attacks. Cryptographic implementations of the techniques disclosed herein can be combined with error-detection and/or error-correction logic to ensure that cryptographic operations are performed correctly. For example, a simple and effective technique is to perform cryptographic operations twice, ideally using two independent hardware processors and implementations, with a comparator to verify that both produce identical results. If the results produced by the two units do not match, the comparator will prevent either result from being used. In situations where security is more important than reliability, the comparator can make the device self-destruct if serious errors occur. For example, the comparator can cause a self-destruct if two defective DES operations occur sequentially or if five defective DES operations occur during the lifetime of the device. In some cryptosystems, redundancy is not necessary. For example, with RSA, self-checking functions can be incorporated into the cryptosystem implementation itself or verification can be performed after the operations.

Self-diagnostic functions such as a POST (power-on-self-test) should also be incorporated to verify that cryptographic functions have not been damaged. In some smartcards and other devices, the ATR (answer-to-reset) is provided before a comprehensive self-test can be completed. In such cases, the self-test can be deferred until the first transaction or until a sufficient idle period. For example, a flag indicating successful POST completion can be set upon initialization. While the card is waiting for a command from the host system, it can attempt the POST. Any I/O received during the POST will cause an interrupt, which will cancel the POST (leaving the POST-completed flag at zero). If any cryptographic function is called, the device will check the POST flag and (if it is not set) perform the POST first.

Conclusions

This patent encompasses a family of related techniques that enable the construction of devices that are significantly more resistant to attack than devices of similar cost and complexity that do not use the techniques disclosed herein. In addition, multiple security techniques might be required to make a system secure; and leak resistance can be used in conjunction with other security methods or countermeasures.

As those skilled in the art will appreciate, the techniques described above are not limited to particular host environments or form factors. Rather, they can be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including, without limitation broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

All of the foregoing illustrates exemplary embodiments and applications from which related variations, enhancements and modifications will be apparent without departing from the spirit and scope of those particular techniques disclosed herein. Therefore, the invention(s) should not be limited to the foregoing disclosure, but rather construed by the claims appended hereto.

What is claimed is:

1. A portable cryptographic hardware token for deriving cryptographic authentication codes for securing transactions, said token operable to limit the number of times secret keys are used, thereby providing protection against external monitoring attacks, comprising:
   (a) a memory configured to store a value for each of a plurality of keys, each of said plurality of keys associated with a different one of a plurality of levels, said plurality of keys comprising a top-level key, a plurality of intermediate-level keys, and a lowest-level key, said plurality of intermediate-level keys comprising at least
      a second-to-lowest level key,
      a third-to-lowest level key, and
      a fourth-to-lowest level key;
   (b) a processor configured to perform a key update operation, wherein said key update operation comprises communicating with said memory,
      receiving as an input from said memory a stored value of one of said keys at a particular one of said plurality of levels, and
      operating on said received key value using a block cipher to generate a value for a key one level below said particular level; and
   (c) a timer;
   wherein said processor is further configured to use said key update operation and said timer to periodically derive new key values comprising:
      (i) at least one new value for said lowest-level key, where said stored value of said second-to-lowest level key is an input to said key update operation;
      (ii) at least one new value for said second-to-lowest level key, where said stored value of said third-to-lowest level key is an input to said key update operation, and where said at least one new value for said second-to-lowest level key is derived after deriving said at least one new value for said lowest-level key; and (iii) at least one new value for said third-to-lowest level key, where said stored value of said fourth-to-lowest level key is an input to said key update operation, and where said at least one new value for said third-to-lowest level key is derived after deriving said at least one new value for said second-to-lowest level key;

and wherein said token is operable to secure a transaction with a server based on a value derived from said at least one new value for said lowest-level key.

2. The portable cryptographic hardware token of claim 1 having a key index value produced using said timer.

3. The portable cryptographic hardware token of claim 1, where said value derived from said at least one new value for said lowest-level key is produced by encryption.

4. The portable cryptographic hardware token of claim 1, where said value derived from said at least one new value for said lowest-level key is produced by hashing.

5. A system comprising the portable cryptographic hardware token of claim 1 in combination with said a server, wherein said server is configured to authenticate said token by:
   (a) obtaining a candidate key index value for said token;
   (b) obtaining said token's top-level key value;
   (c) deriving a server-side second-to-top level key value, corresponding to said candidate key index value, by performing a server-side key update operation, where said token's top-level key value is an input to said server-side key update operation;
   (d) deriving a succession of server-side key values, including a server-side lowest-level key value, by performing a succession of server-side key update operations,
      where each of said succession of server-side key values is associated with a different one of a plurality of server-side levels, and
      where each server-side key value for a particular server-side level above said lowest-level is an input to a corresponding one of said succession of server-side key update operations for deriving a server-side key value one level below said particular server-side level;
   (e) using a value derived from said server-side lowest-level key value during an attempt to authenticate said token; and
   (f) if said attempt to authenticate said token fails, repeating (c) through (e) with another candidate key index value.

6. The system of claim 5, wherein said server is further configured to obtain said candidate key index value directly from said token.

7. The system of claim 5, wherein said server is further configured to obtain said candidate key index value indirectly.

8. A method for deriving cryptographic authentication codes in a portable cryptographic hardware token for securing transactions, where said method limits the number of times secret keys are used, thereby providing protection against external monitoring attacks, comprising:
   (a) storing in a memory a value for each of a plurality of keys, each of said plurality of keys associated with a different one of a plurality of levels, said plurality of keys comprising a top-level key, a plurality of intermediate-level keys, and a lowest-level key, said plurality of intermediate-level keys comprising at least a second-to-lowest level key,
      a third-to-lowest level key, and
      a fourth-to-lowest level key;
   (b) performing a key update operation in a processor configured to communicate with said memory, wherein said key update operation comprises receiving as an input from said memory a stored value of one of said keys at a particular one of said plurality of levels, and operating on said received value in said processor using a block cipher to generate a value for a key one level below said particular level;
   (c) periodically deriving new key values using said key update operation and a timer, said periodically deriving comprising:
      (i) deriving at least one new value for said lowest-level key where said stored value of said second-to-lowest level key is an input to said key update operation;
      (ii) deriving at least one new value for said second-to-lowest level key where said stored value of said third-to-lowest level key is an input to said key update operation, and where said at least one new value for said second-to- lowest level key is derived after deriving said at least one new value for said lowest-level key;
      (iii) deriving at least one new value for said third-to-lowest level key where said value of said fourth-to-lowest level key is an input to said key update operation, and where said at least one new value for said third-to-lowest level key is derived after deriving said at least one new value for said second-to-lowest level key; and
   (d) deriving a value from said at least one new value for said lowest-level key for securing a transaction with a server.

9. The method of claim 8, having a key index value produced using said timer.

10. The method of claim 8, where said value derived from said at least one new value for said lowest-level key is produced by encryption.

11. The method of claim 8, where said value derived from said at least one new value for said lowest-level key is produced by hashing.

12. The method of claim 8, further comprising:
authenticating said token by said server when securing a transaction with said server by:
   (a) obtaining a candidate key index value for said token;
   (b) obtaining said token's top-level key value;
   (c) deriving a server-side second-to-top level key value corresponding to said candidate key index value, by performing a server-side key update operation, where said token's top-level key value is an input to said server-side key update operation;
   (d) deriving a succession of server-side key values, including a server-side lowest-level key value, by performing a succession of server-side key update operations,
      where each of said succession of server-side key values is associated with a different one of a plurality of server-side levels, and
      where each server-side key value for a particular server-side level above said lowest-level is an input to a corresponding one of said succession of server-side key update operations for deriving a server-side key value one level below said particular server-side key level;

(e) attempting to authenticate said token using a value derived from said server-side lowest-level key value; and (f) if said attempt to authenticate said token fails, repeating steps (c) through (e) with another candidate key index value.

13. The method of claim 12, wherein said server obtains said candidate key index value directly from said token.

14. The method of claim 12, where said server obtains said candidate key index value indirectly.

15. A method of deriving cryptographic authentication codes to secure transactions between a user of a hardware token and a server while providing protection against external monitoring attacks in said token, said token including a memory containing a plurality of key values from a top-level to a lowest-level, where said number of levels is at least four, comprising:

in said token,
(a) using a timer to update a key index value;
(b) performing at least one key update operation based on said key index value to update at least a portion of said memory, where:
  (i) each key update operation in said at least one key update operation includes a block cipher operation;
  (ii) each key update operation in said at least one key update operation uses a parent key value as an input to derive a child key value at a level below said parent key value, where at least one child key value corresponds to the lowest-level key value; and
  (iii) only the key values affected by a change in said key index value are updated; and
(c) deriving a value from said lowest-level key value to secure a transaction with a server.

16. The method of claim 15 where said server is configured to authenticate said token by:
(a) obtaining a candidate key index value for said token;
(b) obtaining a top-level key value for said token;
(c) deriving a second-to-top-level key value, corresponding to said candidate value, by performing at least one server-side key update operation, where said top-level key value is an input to said server-side key update operation;
(d) deriving a succession of child key values by performing a succession of server-side key update operations to derive a lowest-level server key value, where a parent key value is an input to each of said server-side key update operations deriving said succession child key values;
(e) using a value derived from said lowest-level server key value during an attempt to authenticate said token; and
(f) if said attempt to authenticate said token fails, repeating said steps (c) through (e) with one or more new candidate values.

17. The method of claim 15 where said token's key index value is produced using said timer.

18. The method of claim 15 where said value derived from said lowest-level key value is produced by encrypting.

19. The method of claim 15 where said value derived from said lowest-level key value is produced by hashing.

20. The method of claim 16 where said candidate key index value is obtained directly from said token.

21. The method of claim 16 where said candidate key index value is obtained indirectly.

* * * * *